US012750850B2

(12) United States Patent
Abdelghaffar et al.

(10) Patent No.: US 12,750,850 B2
(45) Date of Patent: Sep. 29, 2026

(54) WIDEBAND DOWNLINK PRECODING IN SUBBAND FULL DUPLEX SYMBOLS

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Abdelrahman Mohamed Ahmed Mohamed Ibrahim, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/416,362

(22) Filed: Jan. 18, 2024

(65) Prior Publication Data

US 2024/0381352 A1 Nov. 14, 2024

Related U.S. Application Data

(60) Provisional application No. 63/502,066, filed on May 12, 2023.

(51) Int. Cl.
*H04W 72/1273* (2023.01)
*H04B 7/06* (2006.01)
(Continued)

(52) U.S. Cl.
CPC .... *H04W 72/1273* (2013.01); *H04B 7/06968* (2023.05); *H04L 5/14* (2013.01); *H04W 72/51* (2023.01); *H04W 76/20* (2018.02)

(58) Field of Classification Search
CPC .. H04B 7/06968; H04L 5/14; H04W 72/1273; H04W 72/51; H04W 76/20
See application file for complete search history.

(56) References Cited

U.S. PATENT DOCUMENTS

| | | | | |
|---|---|---|---|---|
| 2021/0091988 | A1* | 3/2021 | Papasakellariou ... | H04B 7/0456 |
| 2021/0092720 | A1* | 3/2021 | Haghighat ........... | H04B 7/0456 |

(Continued)

OTHER PUBLICATIONS

Moderator (CATT), Summary #3 of Subband Non-Overlapping Full Duplex, R1-230xxxx, 3GPP TSG RAN WG1 #112bis-e, Apr. 17, 2023, pp. 1-158. (Year: 2023).*

(Continued)

*Primary Examiner* — Donald L Mills
(74) *Attorney, Agent, or Firm* — Holland & Hart LLP

(57) ABSTRACT

Methods, systems, and devices for wireless communications are described. A user equipment (UE) may receive an indication of dynamic resource block (RB) bundling for downlink transmissions, the dynamic RB bundling associated with a first precoding bundle size set and a second precoding bundle size set. The UE may receive a grant scheduling a downlink transmission associated with a subband full duplex slot, the grant comprising a bundling size indication identifying either the first precoding bundle size set or the second precoding bundle size set. The UE may receive the downlink transmission associated with the subband full duplex slot according to the grant, the downlink transmission received via contiguous frequency resources associated with RB bundling and identified based at least in part on an RB size identified by the bundling size indication, wherein the RB size comprises a narrowband bundle size value, a wideband bundle size value, or a combination thereof.

30 Claims, 16 Drawing Sheets

(51) Int. Cl.

| | |
|---|---|
| ***H04L 5/14*** | (2006.01) |
| ***H04W 72/51*** | (2023.01) |
| ***H04W 76/20*** | (2018.01) |

(56) References Cited

U.S. PATENT DOCUMENTS

| | | | | |
|---|---|---|---|---|
| 2022/0385419 | A1 | 12/2022 | Paz et al. | |
| 2024/0224254 | A1 * | 7/2024 | Yang | H04L 5/0051 |
| 2025/0184975 | A1 * | 6/2025 | Lu | H04L 5/1469 |

OTHER PUBLICATIONS

Al-Imari.M (Mediatek Inc)., et al., "Discussion on Subband Non-overlapping Full Duplex for NR", Meeting #112bis-e, R1-2302736, e-Meeting, Type Discussion, 17-20, FS_NR_DUPLEX_EVO, 3rd Generation Partnership Project, Mobile Competence Centre, 650, Route Des Lucioles, F-06921 Sophia-Antipolis Cedex, France, vol. 3GPP RAN 1, No. Online, Apr. 17, 2023-Apr. 26, 2023, Apr. 7, 2023, XP052293312, 18 Pages.

International Search Report and Written Opinion—PCT/US2024/018211—ISA/EPO—Jun. 18, 2024.

* cited by examiner

WIDEBAND DOWNLINK PRECODING IN SUBBAND FULL DUPLEX SYMBOLS

CROSS REFERENCE

The present application for patent claims the benefit of U.S. Provisional Patent Application No. 63/502,066 by ABDELGHAFFAR et al., entitled "WIDEBAND DOWNLINK PRECODING IN SUBBAND FULL DUPLEX SYMBOLS," filed May 12, 2023, assigned to the assignee hereof, and expressly incorporated by reference herein.

FIELD OF TECHNOLOGY

The following relates to wireless communications, including wideband downlink precoding in subband full duplex symbols.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support wideband downlink precoding in subband full duplex (SBFD) symbols. For example, the described techniques provide for a user equipment (UE) to receive an indication of dynamic resource block bundling for downlink transmissions. The dynamic resource block bundling may be indicative of or otherwise associated with a first precoding bundle size set and a second precoding bundle size set (e.g., may configure two bundling size sets). The UE may receive a grant scheduling a downlink transmission associated with a SBFD slot. The grant may carry or otherwise convey a bundling size indication associated with at least a wideband bundle size value and at least one numerical bundle size value from the first precoding bundle size set. The UE may receive the downlink transmission associated with the SBFD slot according to the grant. The downlink transmission may be received via contiguous frequency resources associated with resource block bundling and identified based at least in part on the wideband bundle size value.

In some examples, the UE may receive an indication of dynamic resource block bundling for downlink transmissions. The dynamic resource block bundling may be indicative of or otherwise associated with a first precoding bundle size set and a second precoding bundle size set. Both of the first precoding bundle size set and the second precoding bundle size set may be associated with either a wideband bundle size value or a numerical bundle size value. The UE may receive a grant scheduling a downlink transmission associated with a SBFD slot. The grant may carry or otherwise convey a bundling size indicator associated with at least the wideband bundle size value from the first precoding bundle size set or from the second precoding bundle size set. The UE may receive the downlink transmission associated with the SBFD slot according to the grant. The downlink transmission may be received via contiguous frequency resources associated with resource block bundling identified based at least in part on the wideband bundle size value.

In some examples, the UE may receive an indication of dynamic resource block bundling for downlink transmissions. The dynamic resource block bundling may be indicative of or otherwise associated with a first precoding bundle size set and a second precoding bundle size set. The first precoding bundle size set may include a first fixed numerical bundle size value and the second precoding bundle size set may include a second fixed numerical bundle size value. The UE may receive a grant scheduling a downlink transmission associated with a SBFD slot. The grant may carry or otherwise convey a bundling indication identifying either the first precoding bundle size set or the second precoding bundle size set. The UE may receive the downlink transmission associated with the SBFD slot according to the grant. The downlink transmission may be received via contiguous frequency resources identified based at least in part on the first fixed numerical bundle size value associated with the first precoding bundle size set or the second fixed numerical bundle size value associated with the second precoding bundle size set.

In some examples, the UE may transmit a UE capability message indicating support for downlink transmission scheduling with wideband precoding across contiguous frequency resources within a subband of a bandwidth part and/or across non-contiguous frequency resources within at least two subbands of the bandwidth part. The UE may receive, based at least in part on the UE capability message, a grant scheduling a downlink transmission across the contiguous frequency resources. The UE may receive the downlink transmission across the contiguous frequency resources within the subband or within at least two subbands of the bandwidth part according to the grant.

A method for wireless communications at a UE is described. The method may include receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, receiving a grant scheduling a downlink transmission associated with a SBFD slot, the grant including a bundling size indication identifying either the first precoding bundle size set or the second precoding bundle size set, and receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

An apparatus (e.g., UE) for wireless communications is described. The apparatus may include one or more memories storing processor-executable code and one or more processors coupled with the one or more memories. The one or more processors may be individually or collectively further operable to execute the code to cause the apparatus to receive an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, receive a grant scheduling a downlink transmission associated with a SBFD slot, the grant including a bundling size indication identifying either the first precoding bundle size set or the second precoding bundle size set, and receive the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Another apparatus (e.g., UE) for wireless communications is described. The apparatus may include means for receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, means for receiving a grant scheduling a downlink transmission associated with a SBFD slot, the grant including a bundling size indication identifying either the first precoding bundle size set or the second precoding bundle size set, and means for receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

A non-transitory computer-readable medium storing code for wireless communications at a UE is described. The code may include instructions executable by one or more processors to receive an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, receive a grant scheduling a downlink transmission associated with a SBFD slot, the grant including a bundling size indication identifying either the first precoding bundle size set or the second precoding bundle size set, and receive the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Some examples of the method, apparatuses, and non-transitory computer-readable medium described herein may further include operations, features, means, or instructions for selecting the first precoding bundle size set based on the bundling size indication, the first precoding bundle size set including both the narrowband bundle size value and the wideband bundle size value and determining the resource block bundling as either wideband or narrowband based on the first precoding bundle size set and a subband size, a bandwidth part size, or both, associated with the downlink transmission.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be larger than half of the subband size.

Some examples of the method, apparatuses, and non-transitory computer-readable medium described herein may further include operations, features, means, or instructions for determining that the resource block bundling includes narrowband based on a number of scheduled resource blocks for the downlink transmission being less than half of the subband size.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be greater than half of a number of subband frequency resources overlapping with a bandwidth part size.

Some examples of the method, apparatuses, and non-transitory computer-readable medium described herein may further include operations, features, means, or instructions for determining that the resource block bundling includes narrowband based on a number of scheduled resource blocks for the downlink transmission being less than half of a number of subband frequency resources overlapping with a bandwidth part size.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be greater than one quarter of the bandwidth part size.

Some examples of the method, apparatuses, and non-transitory computer-readable medium described herein may further include operations, features, means, or instructions for determining that the resource block bundling includes narrowband based on a number of scheduled resource blocks for the downlink transmission being less than one quarter of the bandwidth part size.

Some examples of the method, apparatuses, and non-transitory computer-readable medium described herein may further include operations, features, means, or instructions for receiving a signal identifying a first number of resource blocks for wideband precoding and identifying the resource block bundling based on a second number of scheduled resource blocks for the downlink transmission, the first number of resource blocks for wideband precoding and the bundling size indication.

Some examples of the method, apparatuses, and non-transitory computer-readable medium described herein may further include operations, features, means, or instructions for determining that the resource block bundling includes wideband based on the second number of scheduled resource blocks for the downlink transmission including contiguous frequency resources and the second number of scheduled resource blocks being greater than the first number of resource blocks for wideband precoding.

Some examples of the method, apparatuses, and non-transitory computer-readable medium described herein may further include operations, features, means, or instructions for determining that the resource block bundling includes narrowband based on the second number of scheduled resource blocks for the downlink transmission being less than the first number of resource blocks for wideband precoding.

In some examples of the method, apparatuses, and non-transitory computer-readable medium described herein, receiving the downlink transmission may include operations, features, means, or instructions for assuming a same transmission configuration index (TCI) state, a same quasi-collocation (QCL) relationship, or both, for the contiguous frequency resources, for a bandwidth part (BWP) size associated with the downlink transmission, or both.

In some examples of the method, apparatuses, and non-transitory computer-readable medium described herein, the first precoding bundle size set includes both the wideband bundle size value and the narrowband bundle size value and the second precoding bundle size set includes one of the wideband bundle size value or the narrowband bundle size value.

In some examples of the method, apparatuses, and non-transitory computer-readable medium described herein, the first precoding bundle size set includes a singular first bundle size value and the second precoding bundle size set include a singular second bundle size value, at least one of the singular first bundle size value or the singular second bundle size value include the wideband bundle size value.

In some examples of the method, apparatuses, and non-transitory computer-readable medium described herein, the first precoding bundle size set includes a singular first bundle size value and the second precoding bundle size set include a singular second bundle size value that may be different from the singular first bundle size value and the singular first bundle size value and the singular second bundle size value include numerical values.

In some examples of the method, apparatuses, and non-transitory computer-readable medium described herein, the indication of the dynamic resource block bundling may be received via radio resource control signaling, the indication further identifying the first precoding bundle size set and the second precoding bundle size set.

A method for wireless communications at a UE is described. The method may include transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, receiving, based on the UE capability message, a grant scheduling a downlink transmission in the one or more downlink subbands, and receiving the downlink transmission within the one or more downlink subbands according to the grant.

An apparatus for wireless communications at a UE is described. The apparatus may include one or more processors, memory coupled with the one or more processors, and instructions stored in the memory. The instructions may be executable by the one or more processors to cause the apparatus to transmit a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, receive, based on the UE capability message, a grant scheduling a downlink transmission in the one or more downlink subbands, and receive the downlink transmission within the one or more downlink subbands according to the grant.

Another apparatus (e.g., UE) for wireless communications is described. The apparatus may include means for transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, means for receiving, based on the UE capability message, a grant scheduling a downlink transmission in the one or more downlink subbands, and means for receiving the downlink transmission within the one or more downlink subbands according to the grant.

A non-transitory computer-readable medium storing code for wireless communications at a UE is described. The code may include instructions executable by one or more processors to transmit a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, receive, based on the UE capability message, a grant scheduling a downlink transmission in the one or more downlink subbands, and receive the downlink transmission within the one or more downlink subbands according to the grant.

Some examples of the method, apparatuses, and non-transitory computer-readable medium described herein may further include operations, features, means, or instructions for indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding may be different from the second wideband precoding.

Some examples of the method, apparatuses, and non-transitory computer-readable medium described herein may further include operations, features, means, or instructions for assuming a same TCI state, a same QCL relationship, or both, per set of contiguous frequency resources.

Some examples of the method, apparatuses, and non-transitory computer-readable medium described herein may further include operations, features, means, or instructions for indicating, via the UE capability message, a support for a common wideband precoding across two sets of contiguous frequency resources in at least two subbands within the bandwidth part.

Some examples of the method, apparatuses, and non-transitory computer-readable medium described herein may further include operations, features, means, or instructions for assuming a same TCI state, a same QCL relationship, or both, across the two sets of contiguous frequency resources.

Some examples of the method, apparatuses, and non-transitory computer-readable medium described herein may further include operations, features, means, or instructions for indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding may be a same precoding as the second wideband precoding.

Some examples of the method, apparatuses, and non-transitory computer-readable medium described herein may further include operations, features, means, or instructions for assuming a same TCI state, a same QCL relationship, or both, per set of contiguous frequency resources.

Some examples of the method, apparatuses, and non-transitory computer-readable medium described herein may further include operations, features, means, or instructions for indicating, via the UE capability message, a maximum number of sets of contiguous frequency resources for the wideband precoding supported by the UE, where a default maximum number of sets may be two sets.

A method for wireless communications at a network entity is described. The method may include transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, transmitting a grant to the UE that schedules a downlink transmission associated with a SBFD slot, the grant including a bundling size indication identifying either the first precoding bundle size set of the second precoding bundle size set, and transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

An apparatus (e.g., network entity) for wireless communications. The apparatus may include one or more memories storing processor-executable code and one or more processors coupled with the one or more memories. The one or more processors may be individually or collectively further operable to execute the code to cause the apparatus to transmit, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, transmit a grant to the UE that schedules a downlink transmission associated with a SBFD slot, the grant including a bundling size indication identifying either the first precoding bundle size set of the second precoding bundle size set, and transmit, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Another apparatus (e.g., network entity) for wireless communications is described. The apparatus may include means for transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, means for transmitting a grant to the UE that schedules a downlink transmission associated with a SBFD slot, the grant including a bundling size indication identifying either the first precoding bundle size set of the second precoding bundle size set, and means for transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

A non-transitory computer-readable medium storing code for wireless communications at a network entity is described. The code may include instructions executable by one or more processors to transmit, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof, transmit a grant to the UE that schedules a downlink transmission associated with a SBFD slot, the grant including a bundling size indication identifying either the first precoding bundle size set of the second precoding bundle size set, and transmit, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Some examples of the method, apparatuses, and non-transitory computer-readable medium described herein may further include operations, features, means, or instructions for identifying, via the bundling size indication, the first precoding bundle size set, the first precoding bundle size set including both the narrowband bundle size value and the wideband bundle size value and determining the resource block bundling as either wideband or narrowband based on the first precoding bundle size set and a subband size, a bandwidth part size, or both, associated with the downlink transmission.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be larger than half of the subband size.

Some examples of the method, apparatuses, and non-transitory computer-readable medium described herein may further include operations, features, means, or instructions for determining that the resource block bundling includes narrowband based on a number of scheduled resource blocks for the downlink transmission being less than half of the subband size.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be greater than half of a number of subband frequency resources overlapping with a bandwidth part size.

Some examples of the method, apparatuses, and non-transitory computer-readable medium described herein may further include operations, features, means, or instructions for determining that the resource block bundling includes narrowband based on a number of scheduled resource blocks for the downlink transmission being less than half of a number of subband frequency resources overlapping with a bandwidth part size.

Some examples of the method, apparatuses, and non-transitory computer-readable medium described herein may further include operations, features, means, or instructions for determining that the resource block bundling includes wideband based on a number of scheduled resource blocks for the downlink transmission including contiguous frequency resources and the number of scheduled resource blocks may be greater than one quarter of the bandwidth part size.

Some examples of the method, apparatuses, and non-transitory computer-readable medium described herein may further include operations, features, means, or instructions for determining that the resource block bundling includes narrowband based on a number of scheduled resource blocks for the downlink transmission being less than one quarter of the bandwidth part size.

Some examples of the method, apparatuses, and non-transitory computer-readable medium described herein may further include operations, features, means, or instructions for transmitting a signal identifying a first number of resource blocks for wideband precoding, where the resource block bundling may be identified based on a second number of scheduled resource blocks for the downlink transmission, the first number of resource blocks for wideband precoding and the bundling size indication.

Some examples of the method, apparatuses, and non-transitory computer-readable medium described herein may further include operations, features, means, or instructions for determining that the resource block bundling includes wideband based on the second number of scheduled resource blocks for the downlink transmission including contiguous frequency resources and the second number of scheduled resource blocks being greater than the first number of resource blocks for wideband precoding.

Some examples of the method, apparatuses, and non-transitory computer-readable medium described herein may further include operations, features, means, or instructions for determining that the resource block bundling includes narrowband based on the second number of scheduled resource blocks for the downlink transmission being less than the first number of resource blocks for wideband precoding.

In some examples of the method, apparatuses, and non-transitory computer-readable medium described herein, transmitting the downlink transmission may include operations, features, means, or instructions for assuming a same TCI state, a same QCL relationship, or both, for the contiguous frequency resources, for a BWP size associated with the downlink transmission, or both.

In some examples of the method, apparatuses, and non-transitory computer-readable medium described herein, the first precoding bundle size set includes both the wideband bundle size value and the narrowband bundle size value and the second precoding bundle size set includes one of the wideband bundle size value or the narrowband bundle size value.

In some examples of the method, apparatuses, and non-transitory computer-readable medium described herein, the first precoding bundle size set includes a singular first bundle size value and the second precoding bundle size set include a singular second bundle size value, at least one of the singular first bundle size value or the singular second bundle size value include the wideband bundle size value.

In some examples of the method, apparatuses, and non-transitory computer-readable medium described herein, the first precoding bundle size set includes a singular first bundle size value and the second precoding bundle size set include a singular second bundle size value that may be different from the singular first bundle size value and the singular first bundle size value and the singular second bundle size value include numerical values.

In some examples of the method, apparatuses, and non-transitory computer-readable medium described herein, the indication of the dynamic resource block bundling may be received via radio resource control signaling, the indication further identifying the first precoding bundle size set and the second precoding bundle size set.

A method for wireless communications at a network entity is described. The method may include receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, transmitting, based on the UE capability message, a grant to the UE that schedules a downlink transmission in the one or more downlink subbands, and transmitting the downlink transmission within the one or more downlink subbands according to the grant.

An apparatus (e.g., network entity) for wireless communications is described. The apparatus may include one or more memories storing processor-executable code and one or more processors coupled with the one or more memories. The one or more processors may be individually or collectively further operable to execute the code to cause the apparatus to receive, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, transmit, based on the UE capability message, a grant to the UE that schedules a downlink transmission in the one or more downlink subbands, and transmit the downlink transmission within the one or more downlink subbands according to the grant.

Another apparatus for wireless communications at a network entity is described. The apparatus may include means for receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, means for transmitting, based on the UE capability message, a grant to the UE that schedules a downlink transmission in the one or more downlink subbands, and means for transmitting the downlink transmission within the one or more downlink subbands according to the grant.

A non-transitory computer-readable medium storing code for wireless communications at a network entity is described. The code may include instructions executable by one or more processors to receive, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both, transmit, based on the UE capability message, a grant to the UE that schedules a downlink transmission in the one or more downlink subbands, and transmit the downlink transmission within the one or more downlink subbands according to the grant.

In some examples of the method, apparatuses, and non-transitory computer-readable medium described herein, identifying, based on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding may be different from the second wideband precoding.

Some examples of the method, apparatuses, and non-transitory computer-readable medium described herein may further include operations, features, means, or instructions for assuming a same TCI state, a same QCL relationship, or both, per set of contiguous frequency resources.

In some examples of the method, apparatuses, and non-transitory computer-readable medium described herein, identifying, based on the UE capability message, a support for a common wideband precoding across two sets of contiguous frequency resources in at least two subbands within the bandwidth part.

Some examples of the method, apparatuses, and non-transitory computer-readable medium described herein may further include operations, features, means, or instructions for assuming a same TCI state, a same QCL relationship, or both, across the two sets of contiguous frequency resources.

In some examples of the method, apparatuses, and non-transitory computer-readable medium described herein, identifying, based on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding may be a same precoding as the second wideband precoding.

Some examples of the method, apparatuses, and non-transitory computer-readable medium described herein may further include operations, features, means, or instructions for assuming a same TCI state, a same QCL relationship, or both, per set of contiguous frequency resources.

Some examples of the method, apparatuses, and non-transitory computer-readable medium described herein may further include operations, features, means, or instructions for indicating, via the UE capability message, a maximum number of sets of contiguous frequency resources for the wideband precoding supported by the UE, where a default maximum number of sets may be two sets.

DETAILED DESCRIPTION

Figure 1:
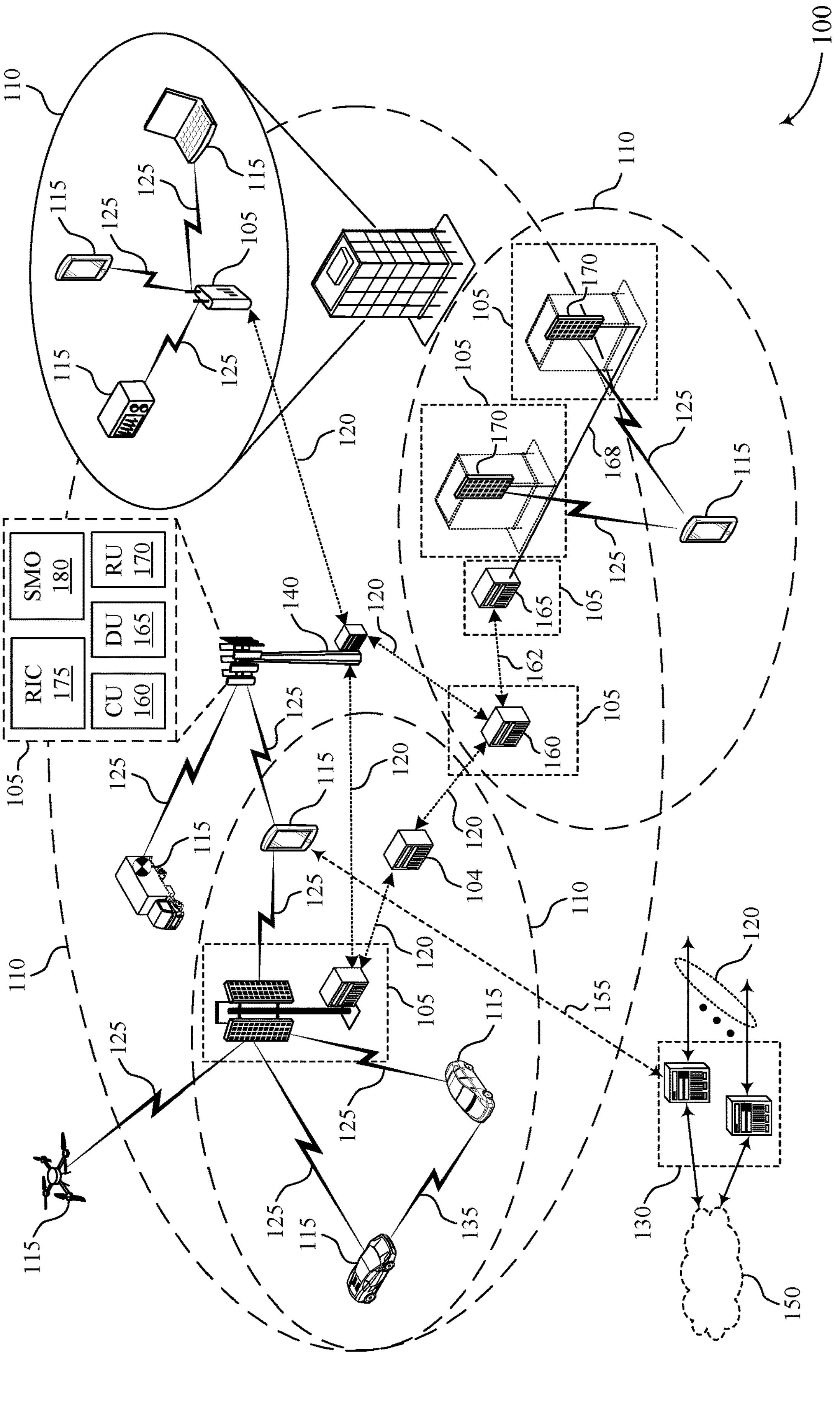
FIG. 1 shows an example of a wireless communications system that supports wideband downlink precoding in subband full duplex (SBFD) symbols in accordance with one or more aspects of the present disclosure.

Wireless networks may support subband full duplex (SBFD) communications where non-contiguous downlink subbands are allocated to user equipment (UE) during some or all slots. Scheduling downlink transmissions for the UE may be based on resource block bundling schemes where frequency resources from one or multiple subbands are scheduled. However, conventional scheduling may define the bandwidth contiguous resource blocks based on the bandwidth of the scheduled frequency resources relative to the bandwidth part (BWP) of the slot. During SBFD slots, such scheduling may limit resource block count determination (e.g., with respect to precoding contiguous resource blocks) by the UE.

The described techniques relate to improved methods, systems, devices, and apparatuses that support wideband downlink precoding in SBFD symbols. For example, the described techniques provide for a UE to receive an indication of dynamic resource block bundling for downlink transmissions. The dynamic resource block bundling may be indicative of or otherwise associated with a first precoding bundle size set and a second precoding bundle size set (e.g., may configure two bundling size sets). The UE may receive a grant scheduling a downlink transmission associated with a SBFD slot. The grant may carry or otherwise convey a bundling size indication associated with at least a wideband bundle size value and at least one numerical bundle size value from the first precoding bundle size set. The UE may receive the downlink transmission associated with the SBFD slot according to the grant. The downlink transmission may be received via contiguous frequency resources associated with resource block bundling and identified based at least in part on the wideband bundle size value.

In some examples, the UE may receive an indication of dynamic resource block bundling for downlink transmissions. The dynamic resource block bundling may be indicative of or otherwise associated with a first precoding bundle size set and a second precoding bundle size set. Both of the first precoding bundle size set and the second precoding bundle size set may be associated with either a wideband bundle size value or a numerical bundle size value. The UE may receive a grant scheduling a downlink transmission associated with a SBFD slot. The grant may carry or otherwise convey a bundling size indicator associated with at least the wideband bundle size value from the first precoding bundle size set or from the second precoding bundle size set. The UE may receive the downlink transmission associated with the SBFD slot according to the grant. The downlink transmission may be received via contiguous frequency resources associated with resource block bundling identified based at least in part on the wideband bundle size value.

In some examples, the UE may receive an indication of dynamic resource block bundling for downlink transmissions. The dynamic resource block bundling may be indicative of or otherwise associated with a first precoding bundle size set and a second precoding bundle size set. The first precoding bundle size set may include a first fixed numerical bundle size value and the second precoding bundle size set may include a second fixed numerical bundle size value. The UE may receive a grant scheduling a downlink transmission associated with a SBFD slot. The grant may carry or otherwise convey a bundling indication identifying either the first precoding bundle size set or the second precoding bundle size set. The UE may receive the downlink transmission associated with the SBFD slot according to the grant. The downlink transmission may be received via contiguous frequency resources identified based at least in part on the first fixed numerical bundle size value associated with the first precoding bundle size set or the second fixed numerical bundle size value associated with the second precoding bundle size set.

In some examples, the UE may transmit a UE capability message indicating support for downlink transmission scheduling with wideband precoding across contiguous frequency resources within a subband of a bandwidth part and/or across non-contiguous frequency resources within at least two subbands of the bandwidth part. The UE may receive, based at least in part on the UE capability message, a grant scheduling a downlink transmission across the contiguous frequency resources. The UE may receive the downlink transmission across the contiguous frequency resources within the subband or within at least two subbands of the bandwidth part according to the grant.

Aspects of the disclosure are initially described in the context of wireless communications systems. Aspects of the disclosure are further illustrated by and described with reference to apparatus diagrams, system diagrams, and flowcharts that relate to wideband downlink precoding in SBFD symbols.

FIG. 1 shows an example of a wireless communications system 100 that supports wideband downlink precoding in SBFD symbols in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, network entity, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support wideband downlink precoding in SBFD symbols as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The UE 115 may receive a grant scheduling a downlink transmission associated with a SBFD slot, the grant comprising a bundling size indication identifying either the first precoding bundle size set or the second precoding bundle size set. The UE 115 may receive the downlink transmission associated with the SBFD slot according to the grant, the downlink transmission received via contiguous frequency resources associated with resource block bundling, the contiguous frequency resources identified based at least in part on a resource block size identified by the bundling size indication, wherein the resource block size comprises the narrowband bundle size value, the wideband bundle size value, or the combination thereof.

A UE 115 may transmit a UE capability message indicating support for downlink transmission scheduling in one or more downlink subbands of a SBFD slot, the downlink transmission scheduling associated with wideband precoding across contiguous frequency resources within a bandwidth part of the UE 115, across non-contiguous frequency resources within the bandwidth part, or both. The UE 115 may receive, based at least in part on the UE capability message, a grant scheduling a downlink transmission in the one or more downlink subbands. The UE 115 may receive the downlink transmission within the one or more downlink subbands according to the grant.

A network entity 105 may transmit, to a UE 115, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The network entity 105 may transmit a grant to the UE 115 that schedules a downlink transmission associated with a SBFD slot, the grant comprising a bundling size indication identifying either the first precoding bundle size set of the second precoding bundle size set. The network entity 105 may transmit, to the UE 115, the downlink transmission associated with the SBFD slot according to the grant, the downlink transmission received via contiguous frequency resources associated with resource block bundling, the contiguous frequency resources identified based at least in part on a resource block size identified by the bundling size indication, wherein the resource block size comprises the narrowband bundle size value, the wideband bundle size value, or the combination thereof.

A network entity 105 may receive, from a UE 115, a UE capability message indicating support for downlink transmission scheduling in one or more downlink subbands of a SBFD slot, the downlink transmission scheduling associated with wideband precoding across contiguous frequency resources within a bandwidth part of the UE 115, across non-contiguous frequency resources within the bandwidth part, or both. The network entity 105 may transmit, based at least in part on the UE capability message, a grant to the UE 115 that schedules a downlink transmission in the one or more downlink subbands. The network entity 105 may transmit the downlink transmission within the one or more downlink subbands according to the grant.

Figure 2:
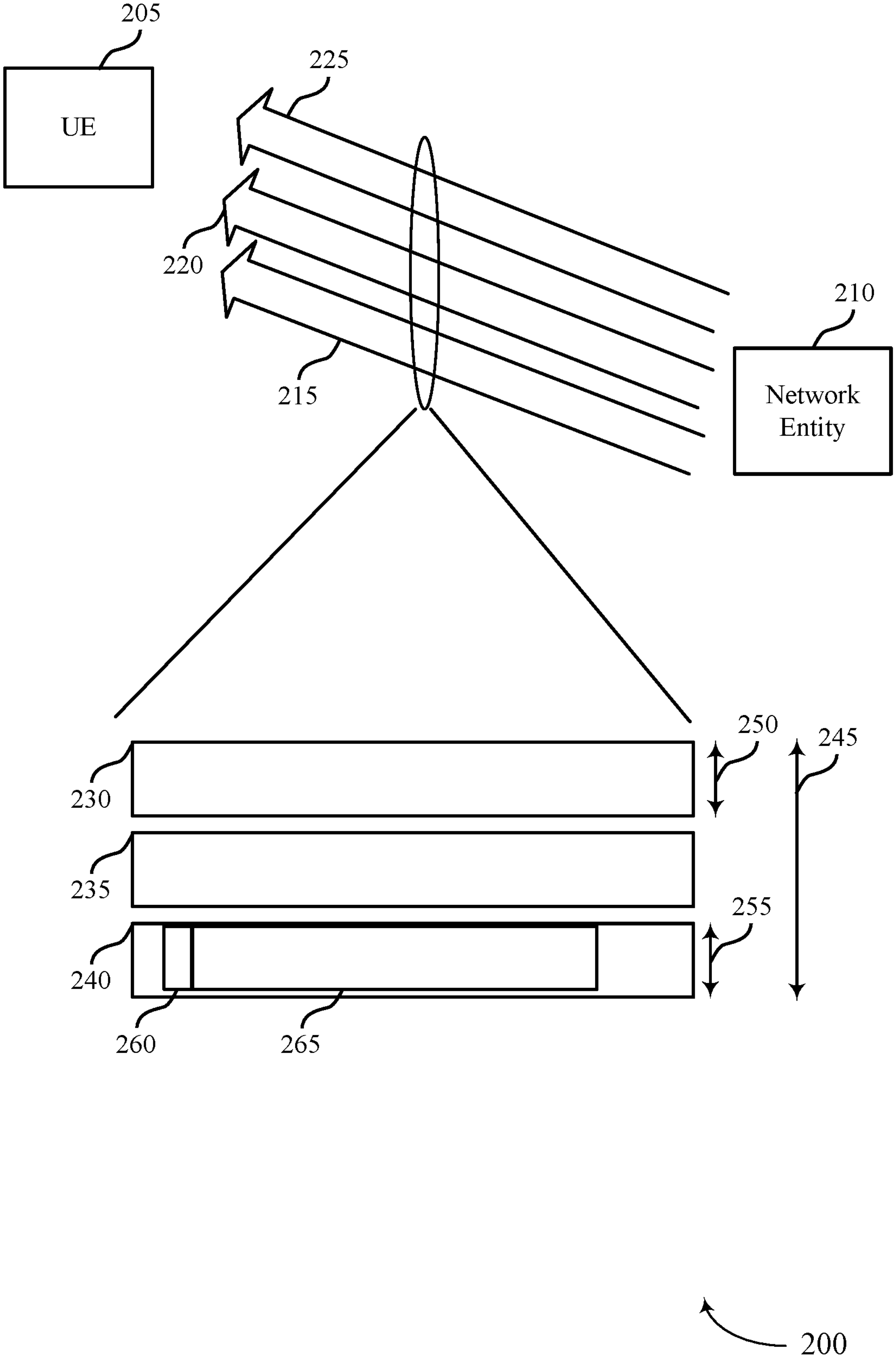
FIG. 2 shows an example of a wireless communications system that supports wideband downlink precoding in SBFD symbols in accordance with one or more aspects of the present disclosure.

FIG. 2 shows an example of a wireless communications system 200 that supports wideband downlink precoding in SBFD symbols in accordance with one or more aspects of the present disclosure. Wireless communications system 200 may implement aspects of wireless communications system 100. Wireless communications system 200 may include a UE 205 and/or a network entity 210, which may be examples of the corresponding devices described herein.

Wireless communications system 200 may support SBFD communications during some or all symbols and/or slots. The SBFD communications may include frequency resources being divided into subbands, with the frequency resources within each subband being allocated to uplink communications or downlink communications. Such techniques generally support full duplex communications within the wireless network. As one non-limiting example, subband 230 and subband 240 may be configured or otherwise allocated to downlink communications with subband 235 being configured or otherwise allocated to uplink communications. Each subband may have a corresponding bandwidth, such as bandwidth 250 of subband 230 and bandwidth 255 of subband 240. Subband 235 allocated for uplink communications may have a corresponding bandwidth as well. The UE 205 may also be configured or otherwise allocated with a BWP 245, which may overlap some or all of the SBFD subbands.

Within each subband, the UE 205 may be scheduled or otherwise allocated for communications with the network entity 210. As another non-limiting example illustrated in FIG. 2, the UE 205 may receive a grant (e.g., a DCI grant 260) scheduling downlink communications (e.g., PDSCH 265).

However, scheduling such downlink communications for SBFD symbols and/or slot may present issues in some circumstances. The transmitting device (e.g., the network entity 210 in this example) generally applies precoding techniques to the downlink transmission prior to sending (e.g., by spreading the data across the scheduled frequency resources/antenna ports to manage aspects of the power ratio for the downlink transmission). The receiving device (e.g., the UE 205 in this example) may be aware of the precoding applied by the transmitting device and use this information when receiving the downlink transmission and recovering the data being conveyed (e.g., based on the data bits being mapped to antenna port/frequency resource).

Accordingly, it is helpful for the receiving device to identify or otherwise determine the precoding technique applied by the transmitting device. To support this, an SBFD aware UE (e.g., the UE 205) may receive an indication of resource block (RB) (also referred to as physical resource block, PRB) bundling applied during precoding by the transmitting device. The RBs may be mapped to a precoding RB group (PRG) that consists of either narrowband RBs or wideband RBs). The narrowband RBs bundling may refer to a numerical value of two (2) RBs or four (4) RBs that may or may not overlap with the subband boundary. The wideband RB bundling may refer to an RB bundling value of "wideband" where the number of RBs may refer to the scheduled bandwidth (e.g., the RBs allocated for the downlink transmission). In some examples, the downlink transmissions may be scheduled in non-contiguous frequency resources across two downlink subbands, but with contiguous frequency resources being scheduled in each downlink subband. In other examples, non-contiguous frequency resources across two downlink subbands may not be supported.

Accordingly, the UE 205 may assume that the precoding granularity of $$P'_{BWP,i},$$

which generally defines the number of consecutive RBs in the frequency domain. The values for $$P'_{BWP,i}$$

(e.g., the RB bundling) may be either two, four, or 'wideband' {2, 4, wideband}. Again, the numerical values 2 and 4 may be considered narrowband in that they are not the 'wideband' RB bundling indication.

For example, at 215 the network entity 210 may transmit or otherwise provide (and the UE 205 may receive or otherwise obtain) an indication of dynamic RB bundling for downlink transmissions from the network entity 210. The indication may be received via higher layer signaling, such as RRC signaling, MAC-CE signaling, or other higher layer signaling. In some examples, the PRB bundling indication may be static (e.g., not dynamic). In some examples, the indication may include a PRB bundling type indication (prb-BundlingType) carried or otherwise conveyed in the RRC signaling. The PRB bundling type indication may be set to a value to indicate whether or not the PRB bundling is dynamic or static. Additional higher layer parameters may be associated with the dynamic PRB bundling type indication. For example, a first precoding bundling size set (e.g., bundleSizeSet1) and a second precoding bundling size set (e.g., bundleSizeSet2) may be configured with $$P'_{BWP,i}$$

values. In some examples, the first precoding bundling size set may take one or two values from {2, 4, wideband} while the second precoding bundling size set may take one value from {2, 4, wideband}.

At 220, the network entity 210 may transmit or otherwise obtain (and the UE 205 may receive or otherwise obtain) a grant (e.g., DCI grant 260) scheduling a downlink transmission (e.g., PDSCH 265) for a SBFD slot (or symbol(s) of a slot). The grant may be a dynamic grant scheduling and allocating resources and parameters for the downlink transmission. The grant may be a semi-persistent grant activating (pre) configured semi-persistent resources for the downlink transmission. The grant may carry or otherwise convey an indication of a bundling size indication that identifies either the first precoding bundle size set or the second precoding bundle size set applied for PRB bundling. In some examples, the PRB bundling size indicator signaled in DCI grant 260 may be set or '0' or to '1.' When set to '0', the UE 205 may use the $$P'_{BWP,i}$$

value from the second set of $$P'_{BWP,i}$$

values (e.g., the second precoding bundle size set) to receive the downlink transmission. When set to '1,' and one value is configured for the first set of $$P'_{BWP,i}$$

values (e.g., one value is configured for the first precoding bundle size set), the UE 205 may use this $$P'_{BWP,i}$$

value to receive the downlink transmission. When set to '1,' and two values are configured for the first set of $$P'_{BWP,i}$$

values (e.g., two values are configured for the first precoding bundle size set) as 'n2-wideband' (corresponding to two $$P'_{BWP,i}$$

values 2 and to wideband) or to 'n4-wideband' (corresponding to two $$P'_{BWP,i}$$

values 4 and wideband), the UE 205 may apply a PRB bundling rule or threshold when determining the RB bundling scheme applied by the transmitting device.

Traditionally, the rule or threshold may be if the scheduled PRBs are contiguous and the size of the scheduled PRBs is larger than half of the BWP 245 of the UE 205, then the $$P^{i}_{BWP,i}$$

is the same as the scheduled bandwidth (e.g., RB bundling is determined as wideband across all the scheduled PRBs). Otherwise, the UE 205 may use the $$P'_{BWP,i}$$

value set to the remaining configured value of 2 or 4. Accordingly, the UE 205 may assume the precoding granularity is $P'_{BWP,i}$ consecutive RBs in the frequency domain, with $P'_{BWP,i}$ being equal to one of the value {2, 4, wideband}. If the $P'_{BWP,i}$ is determined as 'wideband,' the UE 205 may not expect to be scheduled with non-contiguous PRBs and the UE may assume that the same precoding is applied to the allocated frequency resources associated with the same transmission configuration index (TCI) state and/or the same quasi-collocation (QCL) assumption. The UE may assume the same precoding is applied for any downlink contiguous allocation of PRBs in a PRG.

Again, such techniques may be problematic in the context of SBFD communications as the number of scheduled RBs in one downlink subband (e.g., subband 240, in this example) is always less than half of the BWP if the UE 205. That is, as shown in the non-limiting example illustrated in FIG. 2 the BWP 245 of the UE 205 covers two downlink subbands and one uplink subband. That is, since the number of frequency resources within a schedule subband (e.g., the set of contiguous frequency resources) is always less than half of the BWP of the UE 205, the 'wideband'

$P'_{BWP,i}$ value from the first precoding bundling size set may be prevented from being configured for the UE 205 during SBFD slots. More particularly, according to conventional techniques when the first precoding bundle size set is configured as n2-wideband or as n4-wideband, the qualifying condition based on one half of the BWP of the UE 205 (e.g., the scheduled RBs being larger than one half of the BWP of the UE 205 before $P'_{BWP,i}$ can be 'wideband') can never be met. This may result in a misunderstanding between the UE 205 and the network entity 210 during downlink communications as the precoding applied by the network entity 210 may be different from the precoding assumptions (e.g., PRB bundling) of the UE 205 when attempting to receive the downlink transmission.

Accordingly, aspects of the techniques described herein provide for improved downlink communications during SBFD symbols and/or slots. At 225, the network entity 210 may transmit or otherwise provide (and the UE 205 may receive or otherwise obtain) the downlink transmission associated with the SBFD symbol(s)/slot(s) according to the grant. The downlink transmission may be received via contiguous frequency resources associated with RB bundling. For example, the contiguous frequency resources may be identified or otherwise determined based on an RB size (e.g., $P'_{BWP,i}$)

identified by the bundling size indication carried in the grant. The RB size may be a narrowband bundle size value (e.g., either 2 or 4) and/or may be a wideband bundle size value (e.g., 'wideband'). In some examples, the first precoding bundle size set may be associated with two $P'_{BWP,i}$ values (e.g., either n2-wideband or n4-wideband) and the second precoding bundle size set may be associated with one $P'_{BWP,i}$ value (e.g., either 2, 4, or wideband).

In some examples, the bundling size indication may be set to a value of '1' to indicate that the UE 205 is to select the first precoding bundle size set (e.g., bundleSizeSet1). In this example, the first precoding bundle size set is associated with two $P'_{BWP,i}$ values (e.g., either n2-wideband or n4-wideband). In this example, the UE 205 may identify or otherwise the RB size (e.g., $P'_{BWP,i}$)

based on a PRB bundling rule or threshold.

For example, the UE 205 may identify or otherwise select the first precoding bundle size set (e.g., bundleSizeSet1) based on the bundling size indication. Again, the first precoding bundle size set includes both the narrowband bundle size value and the wideband bundle size value. That is, the values associated with the first precoding bundle size set may be n2-wideband or n4-wideband. In this context, the UE 205 may apply the rule or threshold discussed herein to determine whether the RB size (e.g., $P'_{BWP,i}$)

is a numerical value (e.g., either 2 or 4, which are referred to as narrowband bundle size values) or is set to wideband (e.g., where wideband is selected corresponding to the scheduled PRBs). When the rule or threshold are satisfied, the UE 205 may select the $P'_{BWP,i}$ of wideband. Otherwise, the UE 205 may select the numerical value (e.g., either 2 or 4). Broadly, the rule or threshold described herein may be based on the size of the subband (e.g., in the frequency domain) and/or the BWP of the UE 205, as well as the first precoding bundle size set. That is, the 2056 may identify or otherwise determine the RB bundling as wideband or narrowband (e.g., as indicated by the n2-wideband or n4-wideband values of the first precoding bundle size set) for the downlink transmission. In some aspects, the described rule or threshold may be applied when the UE 205 does not support non-contiguous PDSCH with 'wideband' precoding across the two downlink subbands when the higher layer parameter prb-BundlingType is set to 'dynamicBundling."

A first rule or threshold considered or otherwise applied may be based on the size of the subband (e.g., in the bandwidth of the subband in the frequency domain). Broadly, this rule or threshold may be based on whether the number PRBs scheduled for the downlink transmission are at least half the size of the subband (e.g., the subband in which the PDSCH 265 is scheduled, which may be in either downlink subband). One non-limiting example of such a rule or threshold for SBFD may include: if the scheduled PRBs are contiguous and the size of the scheduled PRBs is larger than the size of the size of the subband (e.g., $$N_{SB}^{size}),$$

then $$P'_{BWP,i}$$

may be the same as the scheduled bandwidth. Otherwise, $$P'_{BWP,i}$$

may be set to the remaining configured value of 2 or 4, respectively, where $$N_{SB}^{size}$$

is the size of the subband in which PDSCH is scheduled. Accordingly, the UE 205 may identify or otherwise determine that the RB bundling is 'wideband' based on the number of scheduled RBs for the downlink transmission being contiguous frequency resources and the number of scheduled RBs being larger than half of the subband size. Otherwise, the UE 205 may identify or otherwise determine that the RB bundling is narrowband (e.g., 2 or 4) based on the number of scheduled RBs for the downlink transmission being less than half of the subband size.

A second rule or threshold considered or otherwise applied may be based on the overlapping resources between the BWP of the UE 205 and the subband size. That is, in some examples and as is illustrated in FIG. 2 the BWP 245 of the UE may partially overlap the subband configured for the downlink transmission. Broadly, this rule or threshold may be based on the frequency resources of the subband scheduled for the downlink transmissions that overlap with the BWP. That is, this rule or threshold may be based on whether or not the scheduled PRBs are at least half of the overlapped frequency resources between the downlink BWP and the subband size. Accordingly, the UE 205 may identify or otherwise determine that the RB bundling is wideband based on a number of scheduled RBs for the downlink transmission being contiguous frequency resources and the number of scheduled RBs being greater than half of a number of subband frequency resources overlapping with the BWP size. Otherwise, the UE 205 may identify or otherwise determine that the RB bundling is narrowband (e.g., either 2 or 4) based on the number of scheduled RBs for the downlink transmission being less than half of the number of subband frequency resources overlapping with the BWP size.

A third rule or threshold considered or otherwise applied may be based on the size of the BWP of the UE 205. Broadly, this rule or threshold may be based on whether the scheduled PRBs are one quarter the size of the BWP of the UE 205. Accordingly, the UE 205 may identify or otherwise determine that the RB bundling is wideband based on the number of scheduled RBs for the downlink transmission being contiguous frequency resources and the number of scheduled RBs being greater than one quarter of the BWP size. Otherwise, the UE 205 may identify or otherwise determine that the RB bundling is narrowband based on the number of scheduled RBs for the downlink transmission being less than one quarter of the BWP size.

A fourth rule or threshold considered or otherwise applied may be based on RRC signaling. For example, the network entity 210 may transmit or otherwise provide (and the UE 205 may receive or otherwise obtain) a signal identifying the minimum number of RBs for wideband precoding. The UE 205 may identify or otherwise determine the RB bundling based on the number of scheduled RBs for the downlink transmission, the minimum number of RBs for wideband precoding, and the bundling size indication. A non-limiting example of this rule for SBFD may include: if the scheduled PRBs are contiguous and the size of the scheduled PRBs is larger than number of RBs given by the higher layer parameter 'NoRBsWidebandPRB', the $$P'_{BWP,i}$$

is determined as wideband and being the same as the scheduled bandwidth. Otherwise, $$P'_{BWP,i}$$

may be set to the remaining configured value of 2 or 4, respectively. Accordingly, the UE 205 may identify or otherwise determine that the RB bundling is wideband based on the number of scheduled RB for the downlink transmission being contiguous frequency resources and the number of scheduled RBs being greater than the number of RBs for wideband precoding. Otherwise, the UE 205 may identify or otherwise determine that the RB bundling is narrowband based on the number of scheduled RBs for the downlink transmission being less than the number of RBs for wideband precoding.

Accordingly, the UE 205 may identify or otherwise determine $$P'_{BWP,i}$$

based on the rules or thresholds described herein. The UE 205 may receive the downlink transmission based on the RB bundling size (e.g., $$P'_{BWP,i}).$$

For example, the UE 205 may assume the same TCI and/or QCL relationship for the contiguous frequency resources and/or the BWP.

Additionally, or alternatively, the UE 205 may identify or otherwise determine the $$P'_{BWP,i}$$

based on a change to the manner in which the precoding bundle size set are configured. In particular, when the UE 205 supports contiguous PDSCH with 'wideband' precoding within one of the downlink subbands and the higher layer parameter prb-BundlingType is set to 'dynamicBundling,' the first precoding bundling size set may take only one value among {2, 4, wideband} and the second precoding bundle size set may take one $$P'_{BWP,i}$$

value among {2, 4, wideband}. That is, in some examples the first precoding bundle size set (e.g., bundleSizeSet1) may be associated with only one $$P'_{BWP,i}$$

value (e.g., a singular value of 2, 4, or wideband) rather than being associated with two $$P'_{BWP,i}$$

values (e.g., n2-wideband or n4-wideband). The second precoding bundle size set may also be associated with only one $$P'_{BWP,i}$$

value (e.g., a singular value of 2, 4, or wideband).

If the PRB bundling size indicator signaled in the grant (e.g., in DCI format 1_1) is set to '0', the UE 205 may use the $$P'_{BWP,i}$$

value from the second set of $$P'_{BWP,i}$$

values (e.g., from the second precoding bundle size set) when receiving the PDSCH scheduled by the same DCI. If the PRB bundling size indicator signaled in the grant is set to '1,' the UE 205 may use the $$P'_{BWP,i}$$

value from the first set of $$P'_{BWP,i}$$

values (e.g., from the first set of precoding bundle size set) when receiving the PDSCH scheduled by the same DCI. In some aspects of this example, at least one of the first or second precoding bundle size sets may include the wideband bundle size value.

An additional, or alternative, change to the manner in which the precoding bundle size set are configured based again be based on both the first and second precoding bundle size sets being configured with one singular value, but with both values being numeric values (e.g., 2 or 4). That is, when the UE 205 supports higher layer parameter prb-BundlingType being set to 'dynamicBundling,' bundleSizeSet1 may be fixed to 2 or 4 and bundleSizeSet2 may be fixed to 4 or 2. In this example, the DCI bitfield (e.g., the bundle size indication) may indicate, identify, or otherwise select between one of the two values. In this example, the UE 205 may not expect to be scheduled with wideband PRG.

Figure 3:
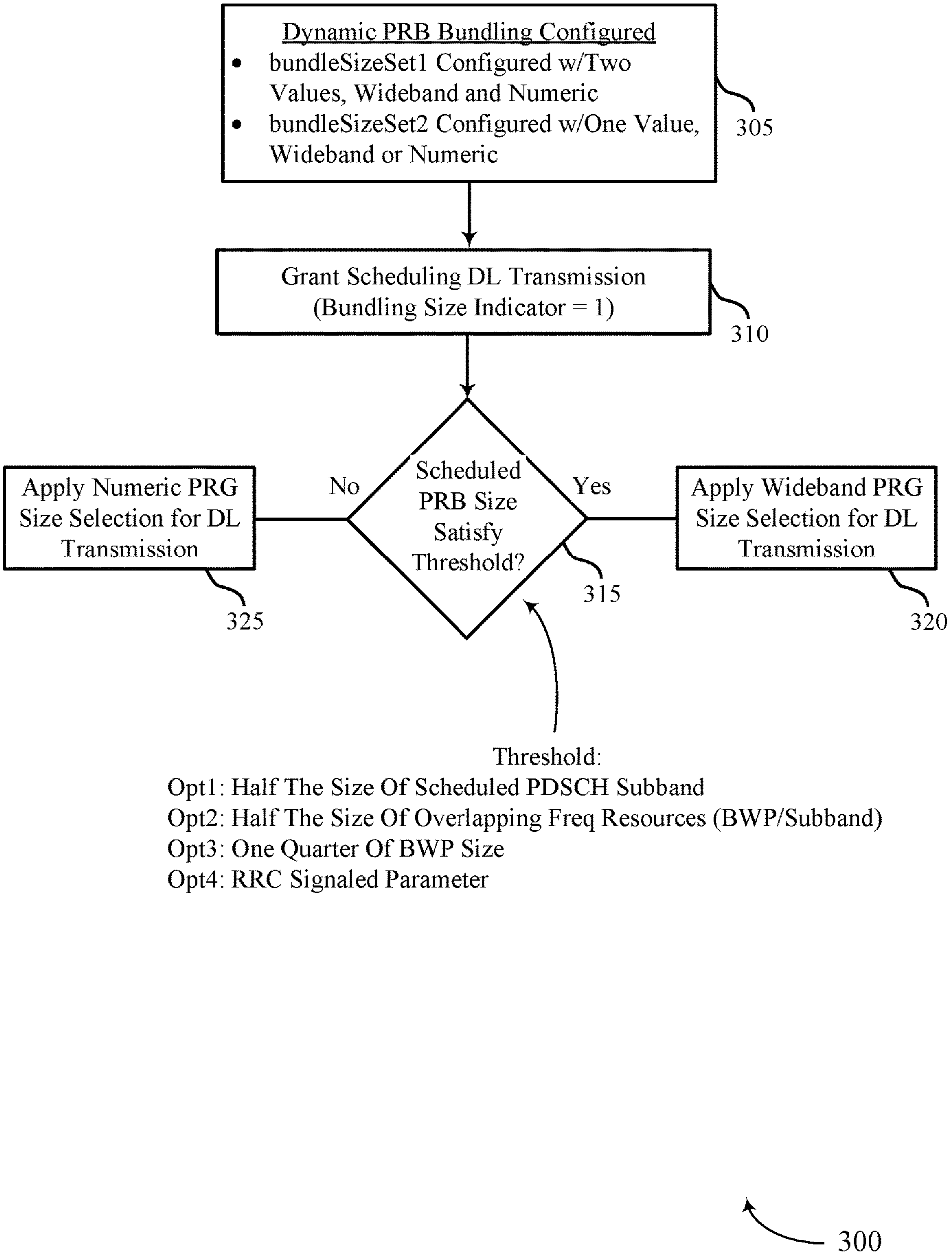
FIG. 3 shows an example of a process that supports wideband downlink precoding in SBFD symbols in accordance with one or more aspects of the present disclosure.

FIG. 3 shows an example of a process 300 that supports wideband downlink precoding in SBFD symbols in accordance with one or more aspects of the present disclosure. Aspects of process 300 may implement aspects of wireless communications system 100 and/or wireless communications system 200. Aspects of process 300 may be implemented by a UE and/or a network entity, which may be examples of the corresponding devices described herein.

At 305, a UE may receive or otherwise obtain an indication of dynamic RB bundling for downlink transmissions to the UE. The indication may be received or otherwise obtained via RRC signaling. The RB bundling indication set to dynamic may identify or otherwise indicate two associated precoding bundle size sets. For example, a first precoding bundle size set (bundleSizeSet1) and a second precoding bundle size set (bundleSizeSet2) associated with the dynamic RB bundling indication. The first precoding bundle size set may have or otherwise be associated with two $$P'_{BWP,i}$$

values (e.g., n2-wideband or n4-wideband) while the second precoding bundle size set may have or otherwise associated with one $P'_{BWP,i}$ value (e.g., 2, 4, or wideband).

At 310, the UE may receive or otherwise obtain a grant scheduling a downlink transmission to the UE. The grant may carry or otherwise convey a bundling size indication that identifies either the first precoding bundle size set or the second precoding bundle size set. More particularly, the bundling size indication may be set to a value of '0' to identify the second precoding bundle size set or set to a value of '1' to identify the first precoding bundle size set. In the non-limiting example illustrated in FIG. 3, the bundling size indication may be set to '1' identifying the first precoding bundle size set, which is associated with two $P'_{BWP,i}$ values in this example.

At 315, the UE may identify or otherwise determine the PRG size (e.g., $P'_{BWP,i}$ based, at least to some degree, on the size of the PRBs scheduled for the downlink transmission. The UE may apply or otherwise consider the options discussed above. The first option may include the UE determining if the $P'_{BWP,i}$ is 2 (e.g., for n2-wideband) or 4 (e.g., for n4-wideband) or determining if the $P'_{BWP,i}$ is 'wideband' (e.g., for either n2-wideband or n4-wideband) based on whether the scheduled PRBs are half (½) the size of the scheduled PDSCH subband. Another option may be based on whether the scheduled PRBs are half (½) the size of the overlapping frequency resources between the BWP of the UE and the subband. Yet another option may be based on whether the scheduled PRBs are one quarter (¼) of the size of the BWP of the UE. Lastly, another option may be based on RRC signaling of parameter(s) identifying the threshold by which the scheduled PRBs are compared to distinguish between narrowband (e.g., 2 or 4) and wideband (e.g., wideband) PRG size selection.

If the UE determines that the PRB bundling is wideband, at 320 the UE may apply wideband PRB size selection for the downlink transmission. That is, the UE may assume that the PRB bundling size for precoding applied by the network entity is the bandwidth of the scheduled PRBs. The UE may use the PRB bundling size when receiving the downlink transmission.

If the UE determines that the PRB bundling is narrowband (e.g., either 2 PRBs or 4 PRBs), at 325 the UE may apply narrowband (e.g., numeric values of 2 or 4) PRB size selection for the downlink transmission. That is, the UE may assume that the PRB bundling size for precoding applied by the network entity is 2 PRBs or 4 PRBs.

Figure 4A:
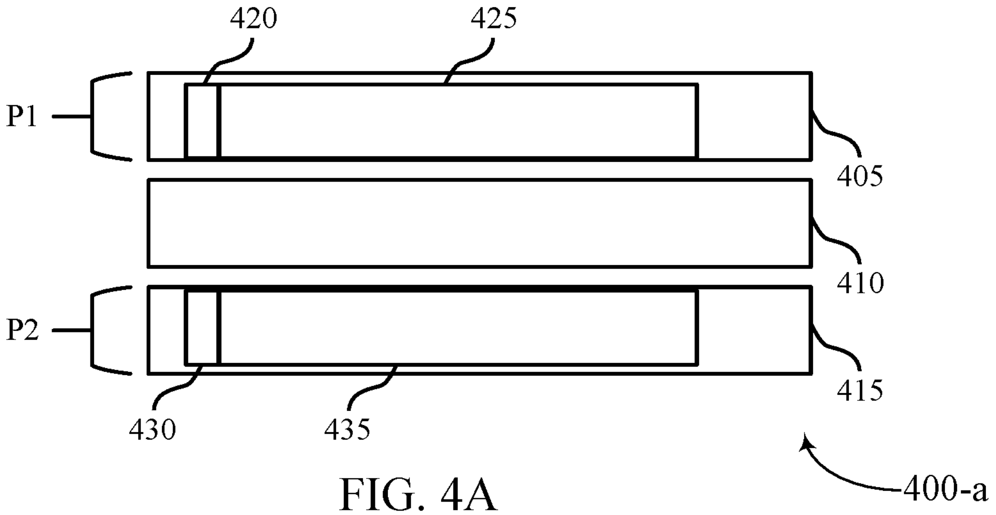
FIGS. 4A and 4B show examples of a subband configuration that supports wideband downlink precoding in SBFD symbols in accordance with one or more aspects of the present disclosure.
Figure 4B:
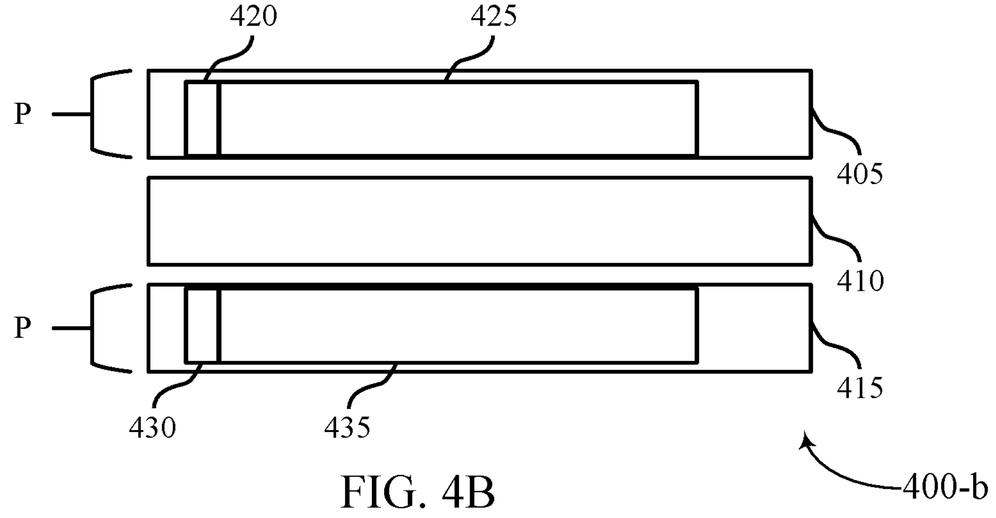

FIGS. 4A and 4B show examples of a subband configuration 400 that supports wideband downlink precoding in SBFD symbols in accordance with one or more aspects of the present disclosure. Aspects of subband configuration 400 may implement aspects of wireless communications system 100 and/or wireless communications system 200 and/or may implement aspects of process 300. Aspects of subband configuration 400 may be implemented at or implemented by a UE and/or network entity, which may be examples of the corresponding devices described herein. Subband configuration 400-*a* of FIG. 4A illustrates a non-limiting example where two different precodings (P1 and P2) are used for two downlink subbands. Subband configuration 400-*b* of FIG. 4B illustrates a non-limiting example where either the same precoder and same QCL assumptions across all allocated resources or across each subset of contiguous frequency resources.

Aspects of the techniques described herein relating to $P'_{BWP,i}$ size selection may be based, at least to some degree, on the capabilities of the UE. For example, the UE may transmit or otherwise provide a UE capability message to the network entity. The UE capability message may indicate or otherwise identify support for downlink transmissions scheduling in downlink subband(s) of a SBFD slot. In the non-limiting example illustrated in FIG. 4, the SBFD slot may include two downlink subbands (e.g., subband 405 and subband 415) which are separated in the frequency domain by one uplink subband (e.g., subband 410). In the non-limiting example illustrated in FIG. 4, the downlink transmissions may include downlink transmissions in each downlink subband. For example, a grant 420 may schedule a downlink transmission 425 (e.g., PDSCH) in subband 405 and/or grant 430 may schedule a downlink transmission 435 (e.g., PDSCH) in subband 415. The downlink transmission may be separate downlink transmissions scheduled within contiguous frequency resources of the respective subband or may be one downlink transmission scheduled in non-contiguous frequency resources across the two subbands, but within contiguous frequency resources within each subband.

Accordingly, the wideband precoding may be across contiguous and/or non-contiguous frequency resources within a BWP of the UE. For example, a SBFD aware UE may report support for PDSCH scheduling with 'wideband' precoding within contiguous PRBs (e.g., within one of the two downlink subbands). Additionally, or alternatively, the SBFD aware UE may report support for PDSCH scheduling with 'wideband' precoding within non-contiguous PRBs (e.g., across the two downlink subbands, but within contiguous frequency resources within each subband). Aspects of the techniques described herein provide various alternatives regarding capability supporting by the UE.

When the UE supports SBFD communications and non-contiguous frequency resources for PDSCH across two downlink subbands with the PRG set to wideband precoding (e.g., the $P'_{BWP,i}$ set to wideband, corresponding to the scheduled PRBs of the downlink transmission), the UE may support various alternatives regarding capability reporting.

Referring to subband configuration 400-*a* of FIG. 4A, one alternative may be that the UE indicates a first support for a first wideband precoding (e.g., P1) for a first set of contiguous frequency resources in a first subband and a second support for a second wideband precoding (e.g., P2) to a second set of contiguous frequency resources in a second subband (e.g., per-subband capability reporting, with each subband supporting different precoding). The first wideband precoding may be different from the second wideband precoding (e.g., P1≠P2).

A non-limiting example of this first alternative may include a rule or threshold (e.g., as discussed above) of if $$P'_{BWP,i}$$

is determined as "wideband" and the UE supports the capability [non-contiguousPRB-widebandPRG-Different-Precoder], the UE may not expected to be scheduled with non-contiguous PRBs that includes more than 'two' subsets of RBs that are not contiguous in frequency and the UE may assume that different precoding is applied to each subset of the RBs. The UE may assume, identify, or otherwise determine that the same TCI and/or QCL relationship in this alternative on a per-set of contiguous frequency resources. As discussed, each set of contiguous frequency resources may be located with a different downlink subband. For example, the first set of contiguous frequency resources of which the first wideband precoding (P1) is applied may correspond to contiguous frequency resources of subband 405 and the second wideband precoding (P2) is applied may correspond to contiguous frequency resources of subband 415, or vice versa.

Referring to subband configuration 400-*b* of FIG. 4B, two other alternatives may be applied. A first of the two other alternatives may be based on a common wideband precoding being applied across two sets of contiguous frequency resources in the two subbands within the BWP of the UE. For example, the UE may identify or otherwise indicate support for the common wideband precoding across the sets of contiguous frequency resources. In this alternative, the same precoder (e.g., P) and the same QCL assumptions may be made across all allocated frequency resources, which may support the UE utilizing combining and/or joint estimation techniques when receiving the downlink transmissions, and may improve performance and communications within the wireless network. The network entity in this alternative may maintain the same QCL assumptions across the two sets of contiguous frequency resources (e.g., such as the same PSD, phase, and the like).

A non-limiting example of this alternative may include if $$P'_{BWP,i}$$

is determined as "wideband" and the UE supports the capability [non-contiguousPRB-widebandPRG-SamePrecoder-sameQCL], the UE may not expected to be scheduled with non-contiguous PRBs that includes more than two subsets of RBs that are not contiguous in frequency and the UE may assume that the same precoding (e.g., P) is applied to each subset of the RBs with the same TCI state and/or the same QCL assumption across the sub-sets of the resource blocks. In this example, the UE may again assume the same TCI state and/or QCL assumption across the sets of contiguous frequency resources.

Referring again to subband configuration 400-*b* of FIG. 4B, a second of the two other alternatives may be based on the same precoder (e.g., P) and the same QCL assumption only across each subset of contiguous frequency resources. A non-limiting example of this alternative may include if $$P'_{BWP,i}$$

is determined as 'wideband' and the UE supports the capability [non-contiguousPRB-widebandPRG-SamePrecoder-DifferentQCL]. For example, the UE may indicate a first support for a first wideband precoding (e.g., P) for a first set of contiguous frequency resources in a first subband and a second support (e.g., P) for a second subband. In this example, the first wideband precoding may be the same precoding as the second wideband precoding (e.g., the same wideband precoding, P, for each subband). The UE may not take advantage of the QCL assumptions across the different subsets of resources. That is, the UE may assume the same TCI state and/or QCL relationship on a per-set of contiguous frequency resources basis.

In some examples, such UE capability reporting may be based on the UE reporting the maximum number of subsets, where each set is scheduled with contiguous frequency allocations. That is, the UE may indicate (e.g., via UE capability reporting) a maximum number of sets of contiguous frequency resources for wideband precoding that is supported by the UE. A default value of 2 (N≥2) may be applied by the UE and/or network entity when the UE has not indicated its supported maximum.

Figure 5:
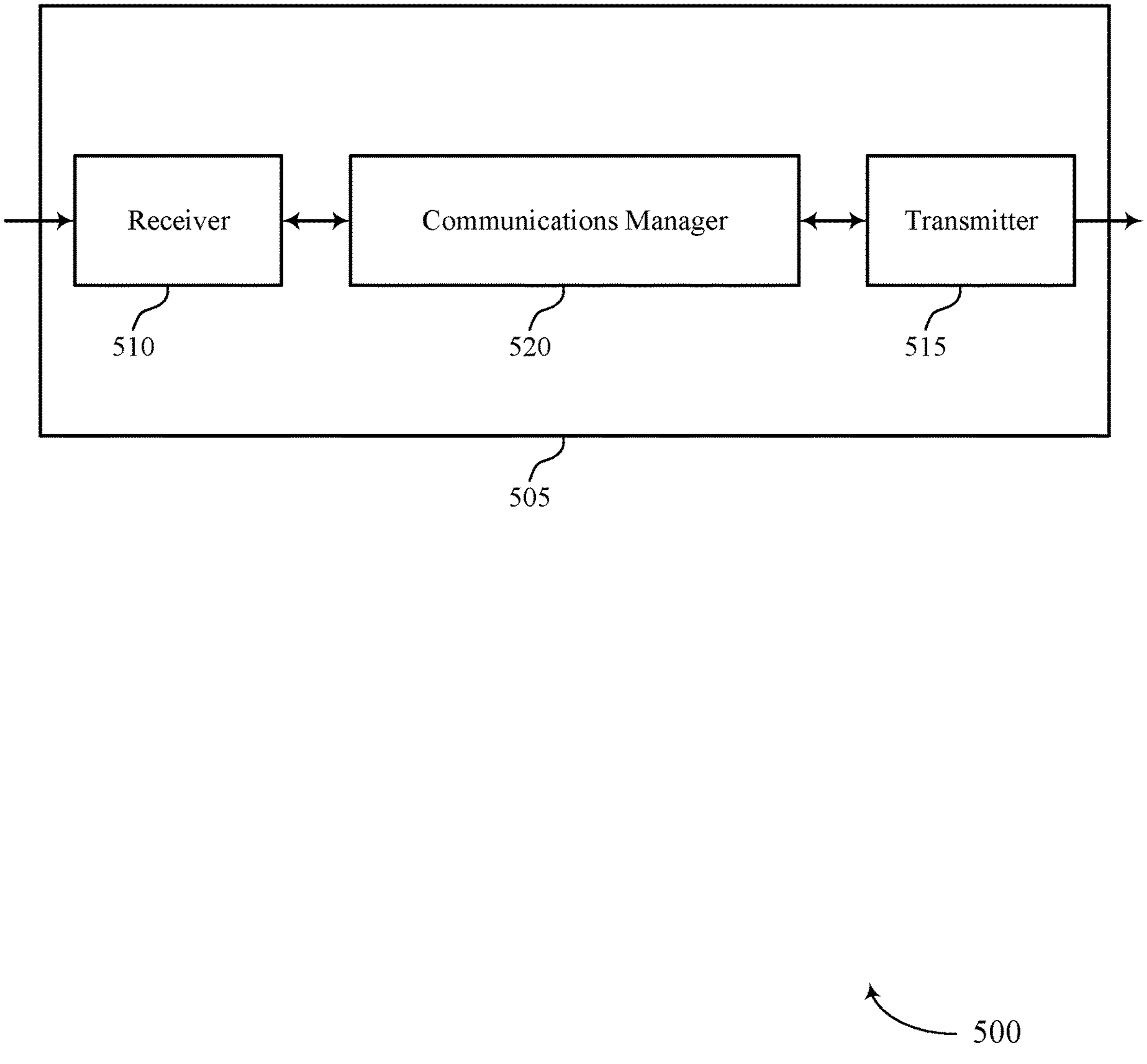
FIGS. 5 and 6 show block diagrams of devices that support wideband downlink precoding in SBFD symbols in accordance with one or more aspects of the present disclosure.

FIG. 5 shows a block diagram 500 of a device 505 that supports wideband downlink precoding in SBFD symbols in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to wideband downlink precoding in SBFD symbols). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to wideband downlink precoding in SBFD symbols). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of wideband downlink precoding in SBFD symbols as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor(s), instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The communications manager 520 is capable of, configured to, or operable to support a means for receiving a grant scheduling a downlink transmission associated with a SBFD slot, the grant including a bundling size indication identifying either the first precoding bundle size set or the second precoding bundle size set. The communications manager 520 is capable of, configured to, or operable to support a means for receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 520 may support wireless communications at a UE in accordance with examples as disclosed herein. For example, the communications manager 520 is capable of, configured to, or operable to support a means for transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The communications manager 520 is capable of, configured to, or operable to support a means for receiving, based on the UE capability message, a grant scheduling a downlink transmission in the one or more downlink subbands. The communications manager 520 is capable of, configured to, or operable to support a means for receiving the downlink transmission within the one or more downlink subbands according to the grant.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved PRB bundling for SBFD based downlink transmissions that enables wideband PRB precoding according to the scheduled bandwidth of the downlink transmission.

Figure 6:
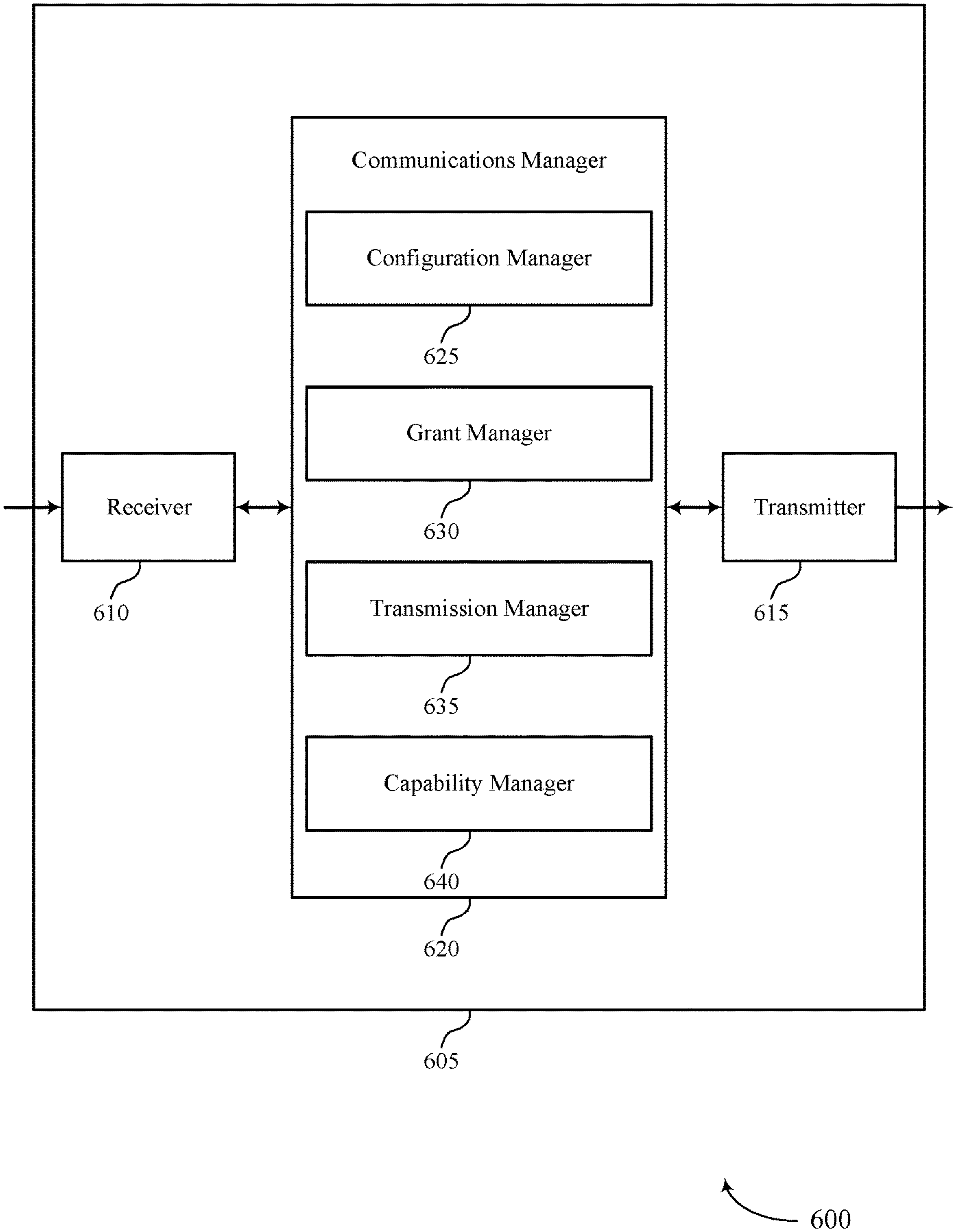

FIG. 6 shows a block diagram 600 of a device 605 that supports wideband downlink precoding in SBFD symbols in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to wideband downlink precoding in SBFD symbols). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to wideband downlink precoding in SBFD symbols). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of wideband downlink precoding in SBFD symbols as described herein. For example, the communications manager 620 may include a configuration manager 625, a grant manager 630, a transmission manager 635, a capability manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The configuration manager 625 is capable of, configured to, or operable to support a means for receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The grant manager 630 is capable of, configured to, or operable to support a means for receiving a grant scheduling a downlink transmission associated with a SBFD slot, the grant including a bundling size indication identifying either the first precoding bundle size set or the second precoding bundle size set. The transmission manager 635 is capable of, configured to, or operable to support a means for receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 620 may support wireless communications at a UE in accordance with examples as disclosed herein. The capability manager 640 is capable of, configured to, or operable to support a means for transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The grant manager 630 is capable of, configured to, or operable to support a means for receiving, based on the UE capability message, a grant scheduling a downlink transmission in the one or more downlink subbands. The transmission manager 635 is capable of, configured to, or operable to support a means for receiving the downlink transmission within the one or more downlink subbands according to the grant.

Figure 7:
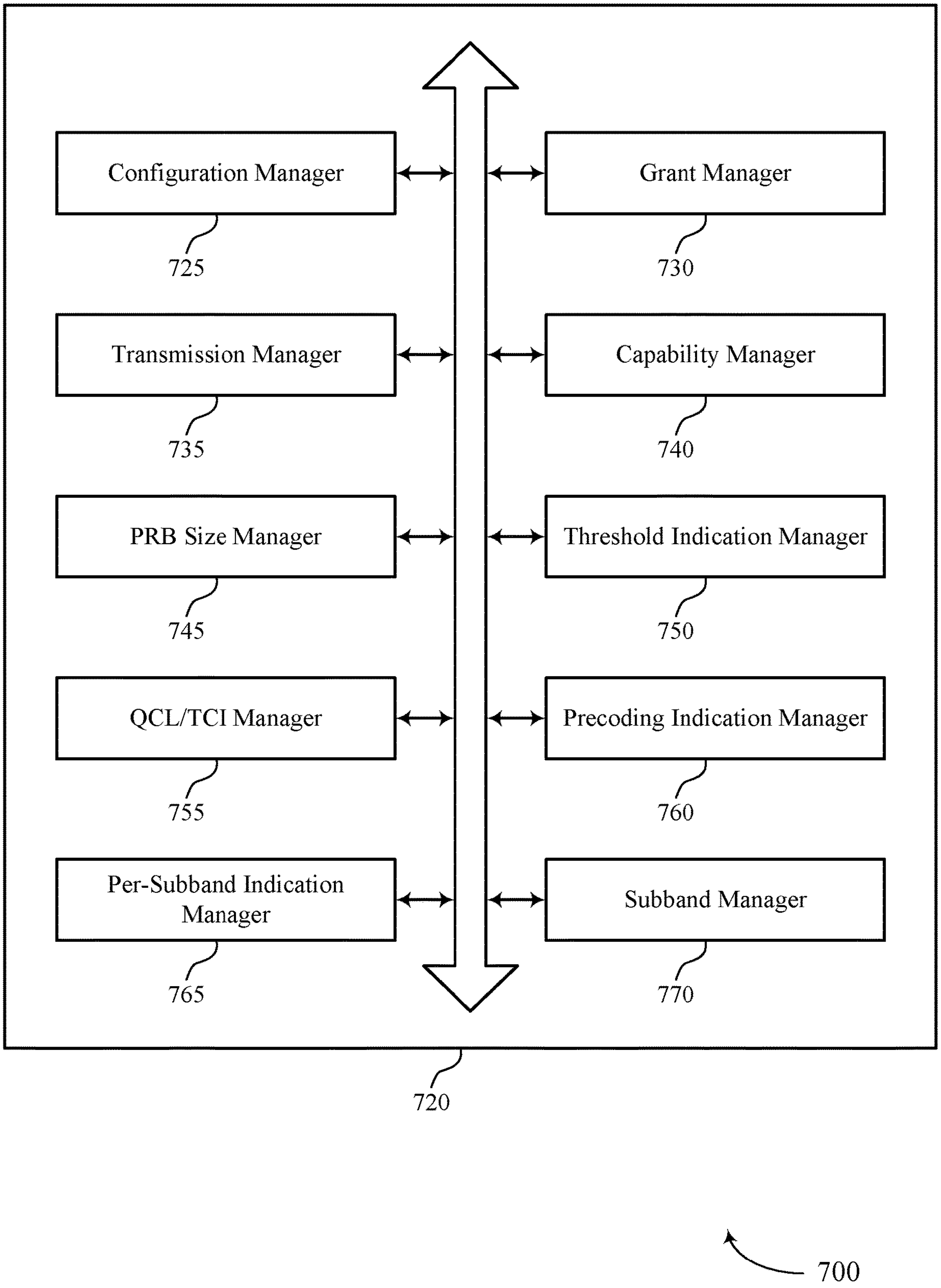
FIG. 7 shows a block diagram of a communications manager that supports wideband downlink precoding in SBFD symbols in accordance with one or more aspects of the present disclosure.

FIG. 7 shows a block diagram 700 of a communications manager 720 that supports wideband downlink precoding in SBFD symbols in accordance with one or more aspects of the present disclosure. The communications manager 720 may be an example of aspects of a communications manager 520, a communications manager 620, or both, as described herein. The communications manager 720, or various components thereof, may be an example of means for performing various aspects of wideband downlink precoding in SBFD symbols as described herein. For example, the communications manager 720 may include a configuration manager 725, a grant manager 730, a transmission manager 735, a capability manager 740, an PRB size manager 745, a threshold indication manager 750, a QCL/TCI manager 755, a precoding indication manager 760, a per-subband indication manager 765, a subband manager 770, or any combination thereof. Each of these components may communicate, directly or indirectly, with one another (e.g., via one or more buses).

The communications manager 720 may support wireless communications at a UE in accordance with examples as disclosed herein. The configuration manager 725 is capable of, configured to, or operable to support a means for receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The grant manager 730 is capable of, configured to, or operable to support a means for receiving a grant scheduling a downlink transmission associated with a SBFD slot, the grant including a bundling size indication identifying either the first precoding bundle size set or the second precoding bundle size set. The transmission manager 735 is capable of, configured to, or operable to support a means for receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

In some examples, the PRB size manager 745 is capable of, configured to, or operable to support a means for selecting the first precoding bundle size set based on the bundling size indication, the first precoding bundle size set including both the narrowband bundle size value and the wideband bundle size value. In some examples, the PRB size manager 745 is capable of, configured to, or operable to support a means for determining the resource block bundling as either wideband or narrowband based on the first precoding bundle size set and a subband size, a bandwidth part size, or both, associated with the downlink transmission.

In some examples, the PRB size manager 745 is capable of, configured to, or operable to support a means for determining that the resource block bundling includes wideband based on a number of scheduled resource blocks for the downlink transmission including contiguous frequency resources and the number of scheduled resource blocks is larger than half of the subband size. In some examples, the PRB size manager 745 is capable of, configured to, or operable to support a means for determining that the resource block bundling includes narrowband based on a number of scheduled resource blocks for the downlink transmission being less than half of the subband size.

In some examples, the PRB size manager 745 is capable of, configured to, or operable to support a means for determining that the resource block bundling includes wideband based on a number of scheduled resource blocks for the downlink transmission including contiguous frequency resources and the number of scheduled resource blocks is greater than half of a number of subband frequency resources overlapping with a bandwidth part size. In some examples, the PRB size manager 745 is capable of, configured to, or operable to support a means for determining that the resource block bundling includes narrowband based on a number of scheduled resource blocks for the downlink transmission being less than half of a number of subband frequency resources overlapping with a bandwidth part size.

In some examples, the PRB size manager 745 is capable of, configured to, or operable to support a means for determining that the resource block bundling includes wideband based on a number of scheduled resource blocks for the downlink transmission including contiguous frequency resources and the number of scheduled resource blocks is greater than one quarter of the bandwidth part size. In some examples, the PRB size manager 745 is capable of, configured to, or operable to support a means for determining that the resource block bundling includes narrowband based on a number of scheduled resource blocks for the downlink transmission being less than one quarter of the bandwidth part size.

In some examples, the threshold indication manager 750 is capable of, configured to, or operable to support a means for receiving a signal identifying a first number of resource blocks for wideband precoding. In some examples, the threshold indication manager 750 is capable of, configured to, or operable to support a means for identifying the resource block bundling based on a second number of scheduled resource blocks for the downlink transmission, the first number of resource blocks for wideband precoding and the bundling size indication.

In some examples, the threshold indication manager 750 is capable of, configured to, or operable to support a means for determining that the resource block bundling includes wideband based on the second number of scheduled resource blocks for the downlink transmission including contiguous frequency resources and the second number of scheduled resource blocks being greater than the first number of resource blocks for wideband precoding. In some examples, the threshold indication manager 750 is capable of, configured to, or operable to support a means for determining that the resource block bundling includes narrowband based on the second number of scheduled resource blocks for the downlink transmission being less than the first number of resource blocks for wideband precoding.

In some examples, to support receiving the downlink transmission, the QCL/TCI manager 755 is capable of, configured to, or operable to support a means for assuming a same TCI state, a same QCL relationship, or both, for the contiguous frequency resources, for a BWP size associated with the downlink transmission, or both. In some examples, the first precoding bundle size set includes both the wideband bundle size value and the narrowband bundle size value and the second precoding bundle size set includes one of the wideband bundle size value or the narrowband bundle size value. In some examples, the first precoding bundle size set includes a singular first bundle size value and the second precoding bundle size set include a singular second bundle size value, at least one of the singular first bundle size value or the singular second bundle size value include the wideband bundle size value.

In some examples, the first precoding bundle size set includes a singular first bundle size value and the second precoding bundle size set include a singular second bundle size value that is different from the singular first bundle size value. In some examples, the singular first bundle size value and the singular second bundle size value include numerical values. In some examples, the indication of the dynamic resource block bundling is received via radio resource control signaling, the indication further identifying the first precoding bundle size set and the second precoding bundle size set.

Additionally, or alternatively, the communications manager 720 may support wireless communications at a UE in accordance with examples as disclosed herein. The capability manager 740 is capable of, configured to, or operable to support a means for transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. In some examples, the grant manager 730 is capable of, configured to, or operable to support a means for receiving, based on the UE capability message, a grant scheduling a downlink transmission in the one or more downlink subbands. In some examples, the transmission manager 735 is capable of, configured to, or operable to support a means for receiving the downlink transmission within the one or more downlink subbands according to the grant.

In some examples, the precoding indication manager 760 is capable of, configured to, or operable to support a means for indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding is different from the second wideband precoding.

In some examples, the precoding indication manager 760 is capable of, configured to, or operable to support a means for assuming a same TCI state, a same QCL relationship, or both, per set of contiguous frequency resources. In some examples, the precoding indication manager 760 is capable of, configured to, or operable to support a means for indicating, via the UE capability message, a support for a common wideband precoding across two sets of contiguous frequency resources in at least two subbands within the bandwidth part. In some examples, the precoding indication manager 760 is capable of, configured to, or operable to support a means for assuming a same TCI state, a same QCL relationship, or both, across the two sets of contiguous frequency resources.

In some examples, the per-subband indication manager 765 is capable of, configured to, or operable to support a means for indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding is a same precoding as the second wideband precoding. In some examples, the per-subband indication manager 765 is capable of, configured to, or operable to support a means for assuming a same TCI state, a same QCL relationship, or both, per set of contiguous frequency resources.

In some examples, the subband manager 770 is capable of, configured to, or operable to support a means for indicating, via the UE capability message, a maximum number of sets of contiguous frequency resources for the wideband precoding supported by the UE, where a default maximum number of sets is two sets.

Figure 8:
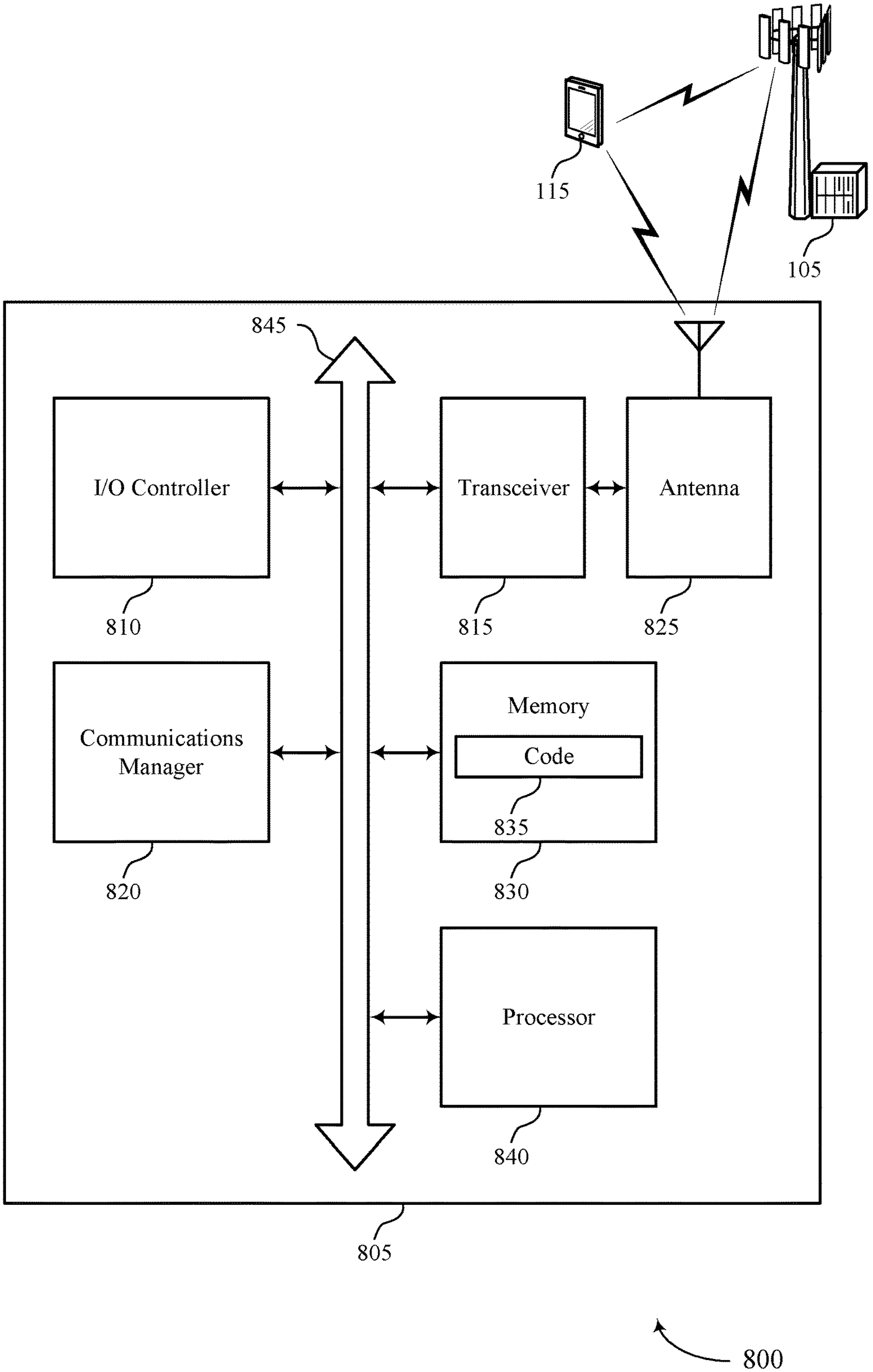
FIG. 8 shows a diagram of a system including a device that supports wideband downlink precoding in SBFD symbols in accordance with one or more aspects of the present disclosure.

FIG. 8 shows a diagram of a system 800 including a device 805 that supports wideband downlink precoding in SBFD symbols in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting wideband downlink precoding in SBFD symbols). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The communications manager 820 is capable of, configured to, or operable to support a means for receiving a grant scheduling a downlink transmission associated with a SBFD slot, the grant including a bundling size indication identifying either the first precoding bundle size set or the second precoding bundle size set. The communications manager 820 is capable of, configured to, or operable to support a means for receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 820 may support wireless communications at a UE in accordance with examples as disclosed herein. For example, the communications manager 820 is capable of, configured to, or operable to support a means for transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The communications manager 820 is capable of, configured to, or operable to support a means for receiving, based on the UE capability message, a grant scheduling a downlink transmission in the one or more downlink subbands. The communications manager 820 is capable of, configured to, or operable to support a means for receiving the downlink transmission within the one or more downlink subbands according to the grant.

By including or configuring the communications manager 820 in accordance with examples as described herein, the device 805 may support techniques for improved PRB bundling for SBFD based downlink transmissions that enables wideband PRB precoding according to the scheduled bandwidth of the downlink transmission.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of wideband downlink precoding in SBFD symbols as described herein, or the processor 840 and the memory 830 may be otherwise configured to perform or support such operations.

Figure 9:
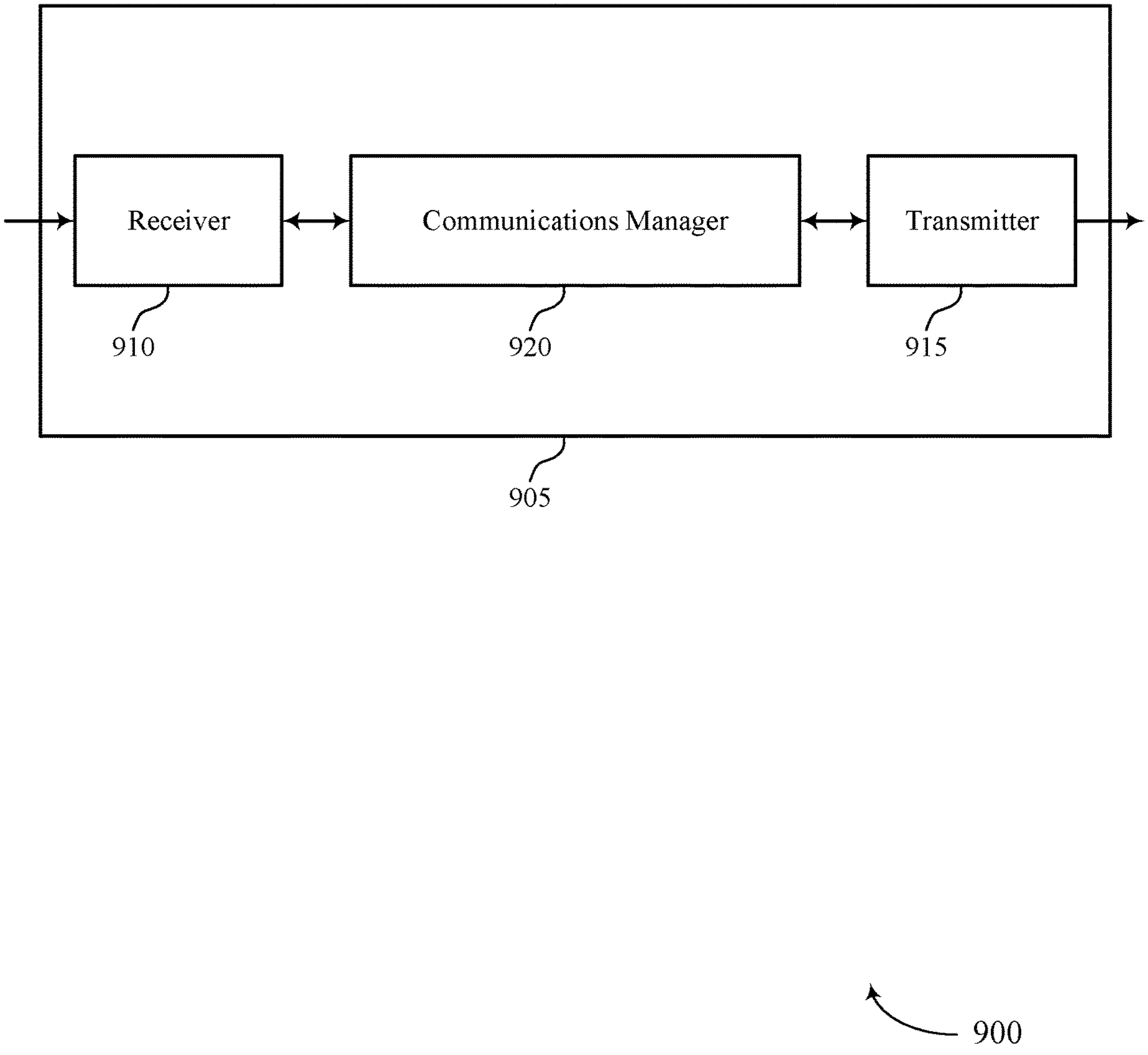
FIGS. 9 and 10 show block diagrams of devices that support wideband downlink precoding in SBFD symbols in accordance with one or more aspects of the present disclosure.

FIG. 9 shows a block diagram 900 of a device 905 that supports wideband downlink precoding in SBFD symbols in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of wideband downlink precoding in SBFD symbols as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor(s), instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The communications manager 920 is capable of, configured to, or operable to support a means for transmitting a grant to the UE that schedules a downlink transmission associated with a SBFD slot, the grant including a bundling size indication identifying either the first precoding bundle size set of the second precoding bundle size set. The communications manager 920 is capable of, configured to, or operable to support a means for transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 920 may support wireless communications at a network entity in accordance with examples as disclosed herein. For example, the communications manager 920 is capable of, configured to, or operable to support a means for receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The communications manager 920 is capable of, configured to, or operable to support a means for transmitting, based on the UE capability message, a grant to the UE that schedules a downlink transmission in the one or more downlink subbands. The communications manager 920 is capable of, configured to, or operable to support a means for transmitting the downlink transmission within the one or more downlink subbands according to the grant.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for improved PRB bundling for SBFD based downlink transmissions that enables wideband PRB precoding according to the scheduled bandwidth of the downlink transmission.

Figure 10:
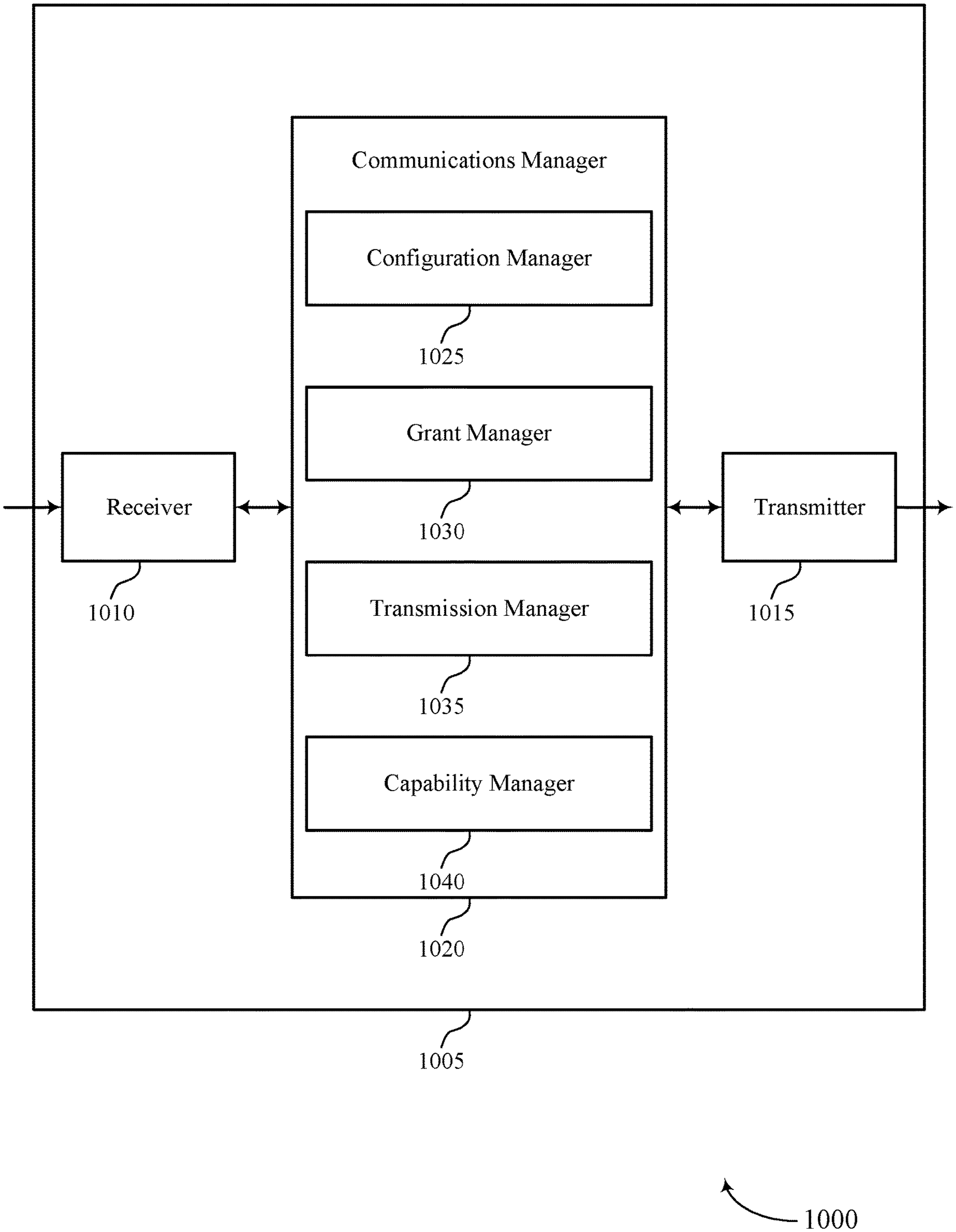

FIG. 10 shows a block diagram 1000 of a device 1005 that supports wideband downlink precoding in SBFD symbols in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of wideband downlink precoding in SBFD symbols as described herein. For example, the communications manager 1020 may include a configuration manager 1025, a grant manager 1030, a transmission manager 1035, a capability manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The configuration manager 1025 is capable of, configured to, or operable to support a means for transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The grant manager 1030 is capable of, configured to, or operable to support a means for transmitting a grant to the UE that schedules a downlink transmission associated with a SBFD slot, the grant including a bundling size indication identifying either the first precoding bundle size set of the second precoding bundle size set. The transmission manager 1035 is capable of, configured to, or operable to support a means for transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 1020 may support wireless communications at a network entity in accordance with examples as disclosed herein. The capability manager 1040 is capable of, configured to, or operable to support a means for receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The grant manager 1030 is capable of, configured to, or operable to support a means for transmitting, based on the UE capability message, a grant to the UE that schedules a downlink transmission in the one or more downlink subbands. The transmission manager 1035 is capable of, configured to, or operable to support a means for transmitting the downlink transmission within the one or more downlink subbands according to the grant.

Figure 11:
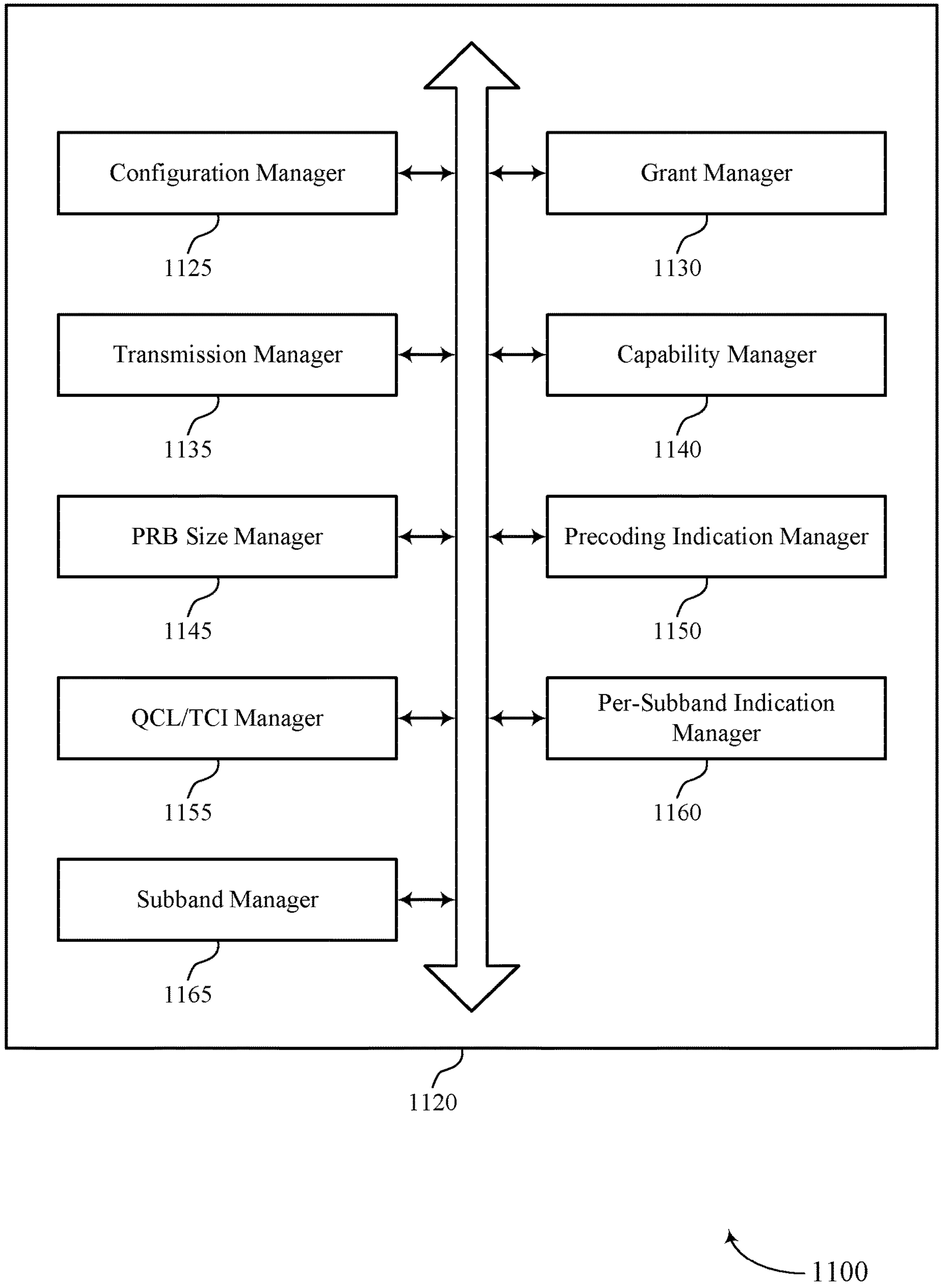
FIG. 11 shows a block diagram of a communications manager that supports wideband downlink precoding in SBFD symbols in accordance with one or more aspects of the present disclosure.

FIG. 11 shows a block diagram 1100 of a communications manager 1120 that supports wideband downlink precoding in SBFD symbols in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of wideband downlink precoding in SBFD symbols as described herein. For example, the communications manager 1120 may include a configuration manager 1125, a grant manager 1130, a transmission manager 1135, a capability manager 1140, an PRB size manager 1145, a precoding indication manager 1150, a QCL/TCI manager 1155, a per-subband indication manager 1160, a subband manager 1165, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The configuration manager 1125 is capable of, configured to, or operable to support a means for transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The grant manager 1130 is capable of, configured to, or operable to support a means for transmitting a grant to the UE that schedules a downlink transmission associated with a SBFD slot, the grant including a bundling size indication identifying either the first precoding bundle size set of the second precoding bundle size set. The transmission manager 1135 is capable of, configured to, or operable to support a means for transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

In some examples, the PRB size manager 1145 is capable of, configured to, or operable to support a means for identifying, via the bundling size indication, the first precoding bundle size set, the first precoding bundle size set including both the narrowband bundle size value and the wideband bundle size value. In some examples, the PRB size manager 1145 is capable of, configured to, or operable to support a means for determining the resource block bundling as either wideband or narrowband based on the first precoding bundle size set and a subband size, a bandwidth part size, or both, associated with the downlink transmission.

In some examples, the PRB size manager 1145 is capable of, configured to, or operable to support a means for determining that the resource block bundling includes wideband based on a number of scheduled resource blocks for the downlink transmission including contiguous frequency resources and the number of scheduled resource blocks is larger than half of the subband size. In some examples, the PRB size manager 1145 is capable of, configured to, or operable to support a means for determining that the resource block bundling includes narrowband based on a number of scheduled resource blocks for the downlink transmission being less than half of the subband size.

In some examples, the PRB size manager 1145 is capable of, configured to, or operable to support a means for determining that the resource block bundling includes wideband based on a number of scheduled resource blocks for the downlink transmission including contiguous frequency resources and the number of scheduled resource blocks is greater than half of a number of subband frequency resources overlapping with a bandwidth part size. In some examples, the PRB size manager 1145 is capable of, configured to, or operable to support a means for determining that the resource block bundling includes narrowband based on a number of scheduled resource blocks for the downlink transmission being less than half of a number of subband frequency resources overlapping with a bandwidth part size.

In some examples, the PRB size manager 1145 is capable of, configured to, or operable to support a means for determining that the resource block bundling includes wideband based on a number of scheduled resource blocks for the downlink transmission including contiguous frequency resources and the number of scheduled resource blocks is greater than one quarter of the bandwidth part size. In some examples, the PRB size manager 1145 is capable of, configured to, or operable to support a means for determining that the resource block bundling includes narrowband based on a number of scheduled resource blocks for the downlink transmission being less than one quarter of the bandwidth part size.

In some examples, the precoding indication manager 1150 is capable of, configured to, or operable to support a means for transmitting a signal identifying a first number of resource blocks for wideband precoding, where the resource block bundling is identified based on a second number of scheduled resource blocks for the downlink transmission, the first number of resource blocks for wideband precoding and the bundling size indication. In some examples, the precoding indication manager 1150 is capable of, configured to, or operable to support a means for determining that the resource block bundling includes wideband based on the second number of scheduled resource blocks for the downlink transmission including contiguous frequency resources and the second number of scheduled resource blocks being greater than the first number of resource blocks for wideband precoding.

In some examples, the precoding indication manager 1150 is capable of, configured to, or operable to support a means for determining that the resource block bundling includes narrowband based on the second number of scheduled resource blocks for the downlink transmission being less than the first number of resource blocks for wideband precoding.

In some examples, to support transmitting the downlink transmission, the QCL/TCI manager 1155 is capable of, configured to, or operable to support a means for assuming a same TCI state, a same QCL relationship, or both, for the contiguous frequency resources, for a BWP size associated with the downlink transmission, or both.

In some examples, the first precoding bundle size set includes both the wideband bundle size value and the narrowband bundle size value and the second precoding bundle size set includes one of the wideband bundle size value or the narrowband bundle size value. In some examples, the first precoding bundle size set includes a singular first bundle size value and the second precoding bundle size set include a singular second bundle size value, at least one of the singular first bundle size value or the singular second bundle size value include the wideband bundle size value. In some examples, the first precoding bundle size set includes a singular first bundle size value and the second precoding bundle size set include a singular second bundle size value that is different from the singular first bundle size value. In some examples, the singular first bundle size value and the singular second bundle size value include numerical values. In some examples, the indication of the dynamic resource block bundling is received via radio resource control signaling, the indication further identifying the first precoding bundle size set and the second precoding bundle size set.

Additionally, or alternatively, the communications manager 1120 may support wireless communications at a network entity in accordance with examples as disclosed herein. The capability manager 1140 is capable of, configured to, or operable to support a means for receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. In some examples, the grant manager 1130 is capable of, configured to, or operable to support a means for transmitting, based on the UE capability message, a grant to the UE that schedules a downlink transmission in the one or more downlink subbands. In some examples, the transmission manager 1135 is capable of, configured to, or operable to support a means for transmitting the downlink transmission within the one or more downlink subbands according to the grant.

In some examples, the precoding indication manager 1150 is capable of, configured to, or operable to support a means for identifying, based on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding is different from the second wideband precoding.

In some examples, the precoding indication manager 1150 is capable of, configured to, or operable to support a means for assuming a same TCI state, a same QCL relationship, or both, per set of contiguous frequency resources. In some examples, the precoding indication manager 1150 is capable of, configured to, or operable to support a means for identifying, based on the UE capability message, a support for a common wideband precoding across two sets of contiguous frequency resources in at least two subbands within the bandwidth part.

In some examples, the precoding indication manager 1150 is capable of, configured to, or operable to support a means for assuming a same TCI state, a same QCL relationship, or both, across the two sets of contiguous frequency resources. In some examples, the per-subband indication manager 1160 is capable of, configured to, or operable to support a means for identifying, based on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, where the first wideband precoding is a same precoding as the second wideband precoding.

In some examples, the per-subband indication manager 1160 is capable of, configured to, or operable to support a means for assuming a same TCI state, a same QCL relationship, or both, per set of contiguous frequency resources.

In some examples, the subband manager 1165 is capable of, configured to, or operable to support a means for indicating, via the UE capability message, a maximum number of sets of contiguous frequency resources for the wideband precoding supported by the UE, where a default maximum number of sets is two sets.

Figure 12:
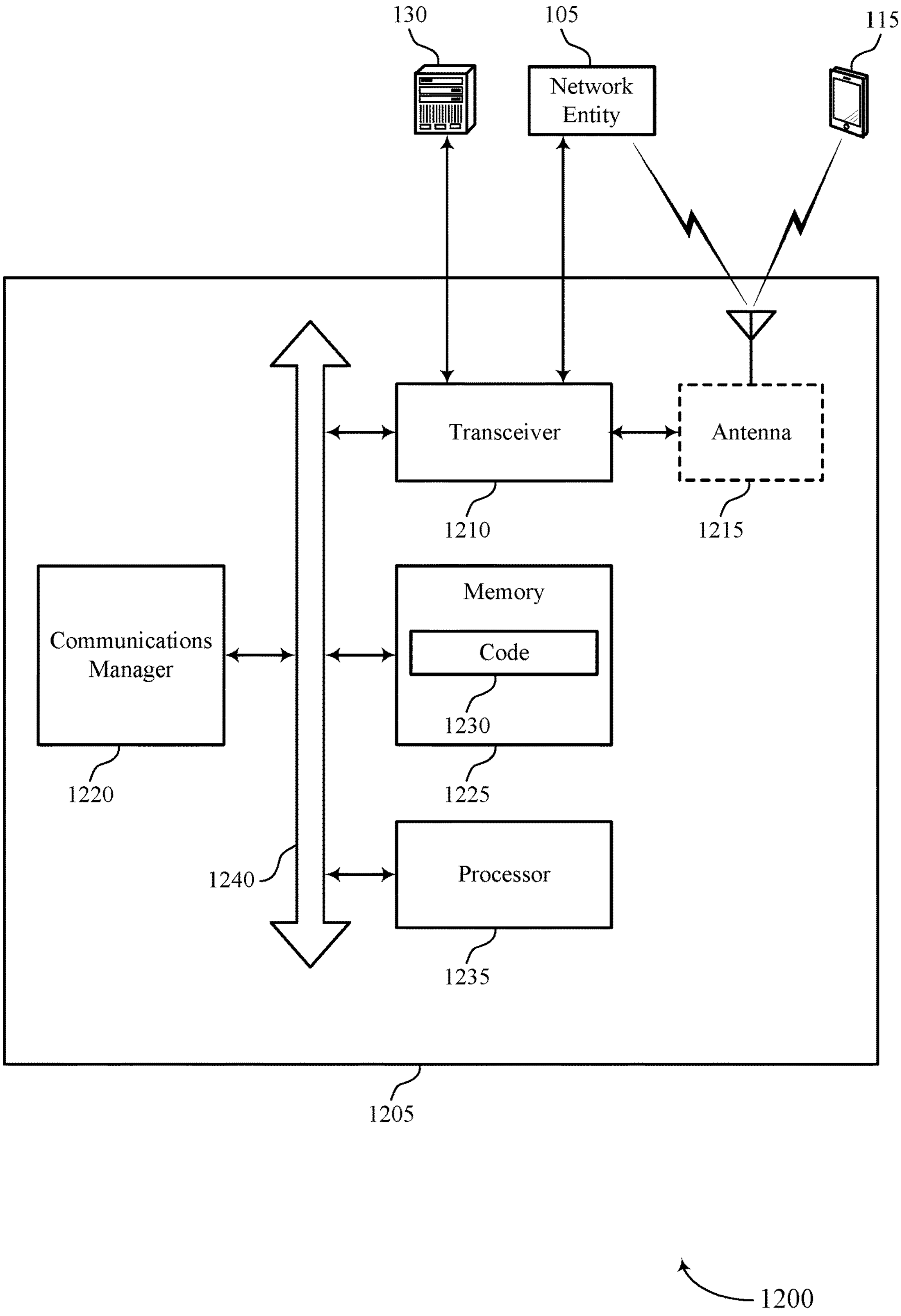
FIG. 12 shows a diagram of a system including a device that supports wideband downlink precoding in SBFD symbols in accordance with one or more aspects of the present disclosure.

FIG. 12 shows a diagram of a system 1200 including a device 1205 that supports wideband downlink precoding in SBFD symbols in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting wideband downlink precoding in SBFD symbols). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The communications manager 1220 is capable of, configured to, or operable to support a means for transmitting a grant to the UE that schedules a downlink transmission associated with a SBFD slot, the grant including a bundling size indication identifying either the first precoding bundle size set of the second precoding bundle size set. The communications manager 1220 is capable of, configured to, or operable to support a means for transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof.

Additionally, or alternatively, the communications manager 1220 may support wireless communications at a network entity in accordance with examples as disclosed herein. For example, the communications manager 1220 is capable of, configured to, or operable to support a means for receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The communications manager 1220 is capable of, configured to, or operable to support a means for transmitting, based on the UE capability message, a grant to the UE that schedules a downlink transmission in the one or more downlink subbands. The communications manager 1220 is capable of, configured to, or operable to support a means for transmitting the downlink transmission within the one or more downlink subbands according to the grant.

By including or configuring the communications manager 1220 in accordance with examples as described herein, the device 1205 may support techniques for improved PRB bundling for SBFD based downlink transmissions that enables wideband PRB precoding according to the scheduled bandwidth of the downlink transmission.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of wideband downlink precoding in SBFD symbols as described herein, or the processor 1235 and the memory 1225 may be otherwise configured to perform or support such operations.

Figure 13:
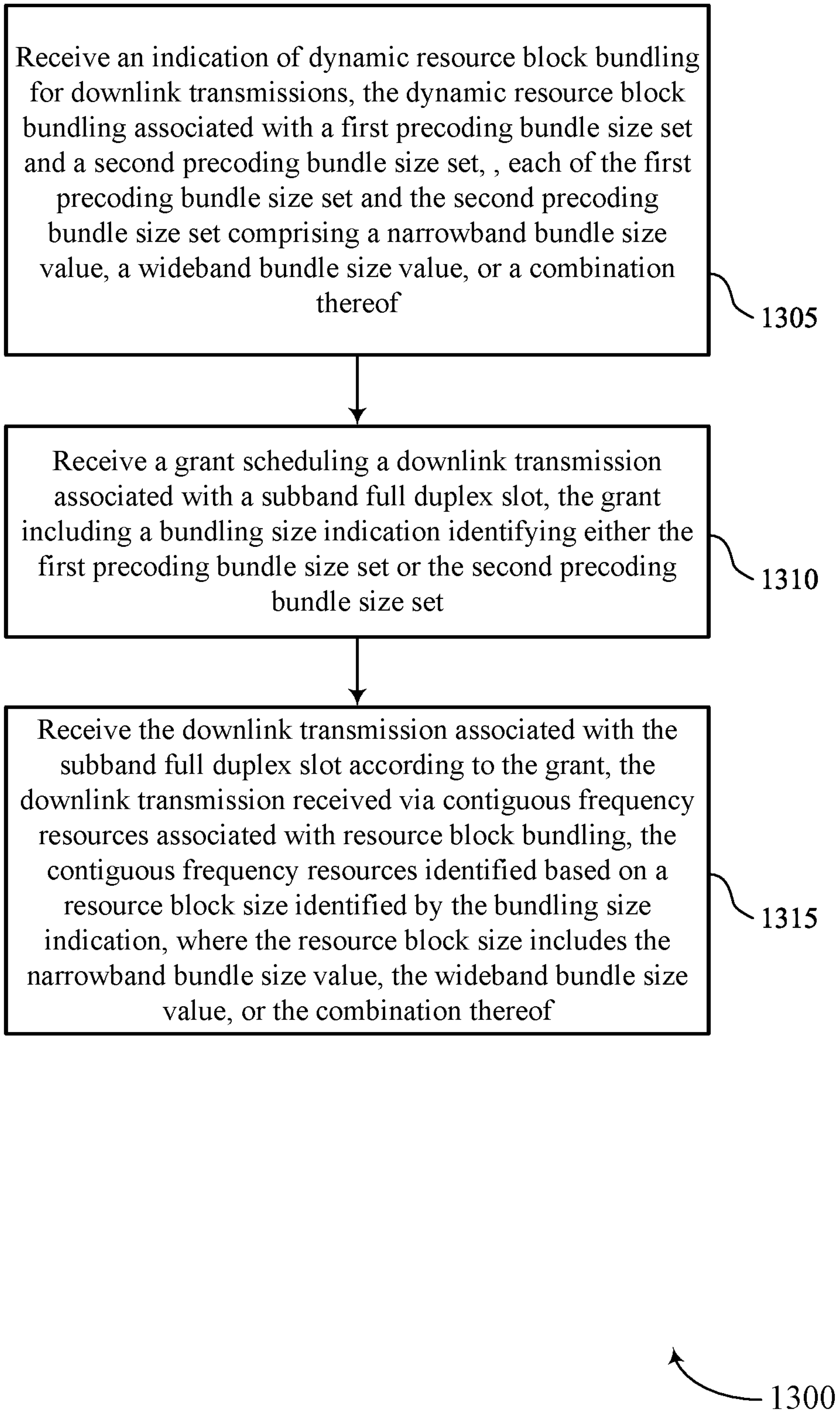
FIGS. 13 through 16 show flowcharts illustrating methods that support wideband downlink precoding in SBFD symbols in accordance with one or more aspects of the present disclosure.

FIG. 13 shows a flowchart illustrating a method 1300 that supports wideband downlink precoding in SBFD symbols in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of dynamic resource block bundling for downlink transmissions, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The operations of block 1305 may be performed in accordance with examples as disclosed herein. In some examples, aspects of the operations of 1305 may be performed by a configuration manager 725 as described with reference to FIG. 7.

At 1310, the method may include receiving a grant scheduling a downlink transmission associated with a SBFD slot, the grant including a bundling size indication identifying either the first precoding bundle size set or the second precoding bundle size set. The operations of block 1310 may be performed in accordance with examples as disclosed herein. In some examples, aspects of the operations of 1310 may be performed by a grant manager 730 as described with reference to FIG. 7.

At 1315, the method may include receiving the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof. The operations of block 1315 may be performed in accordance with examples as disclosed herein. In some examples, aspects of the operations of 1315 may be performed by a transmission manager 735 as described with reference to FIG. 7.

Figure 14:
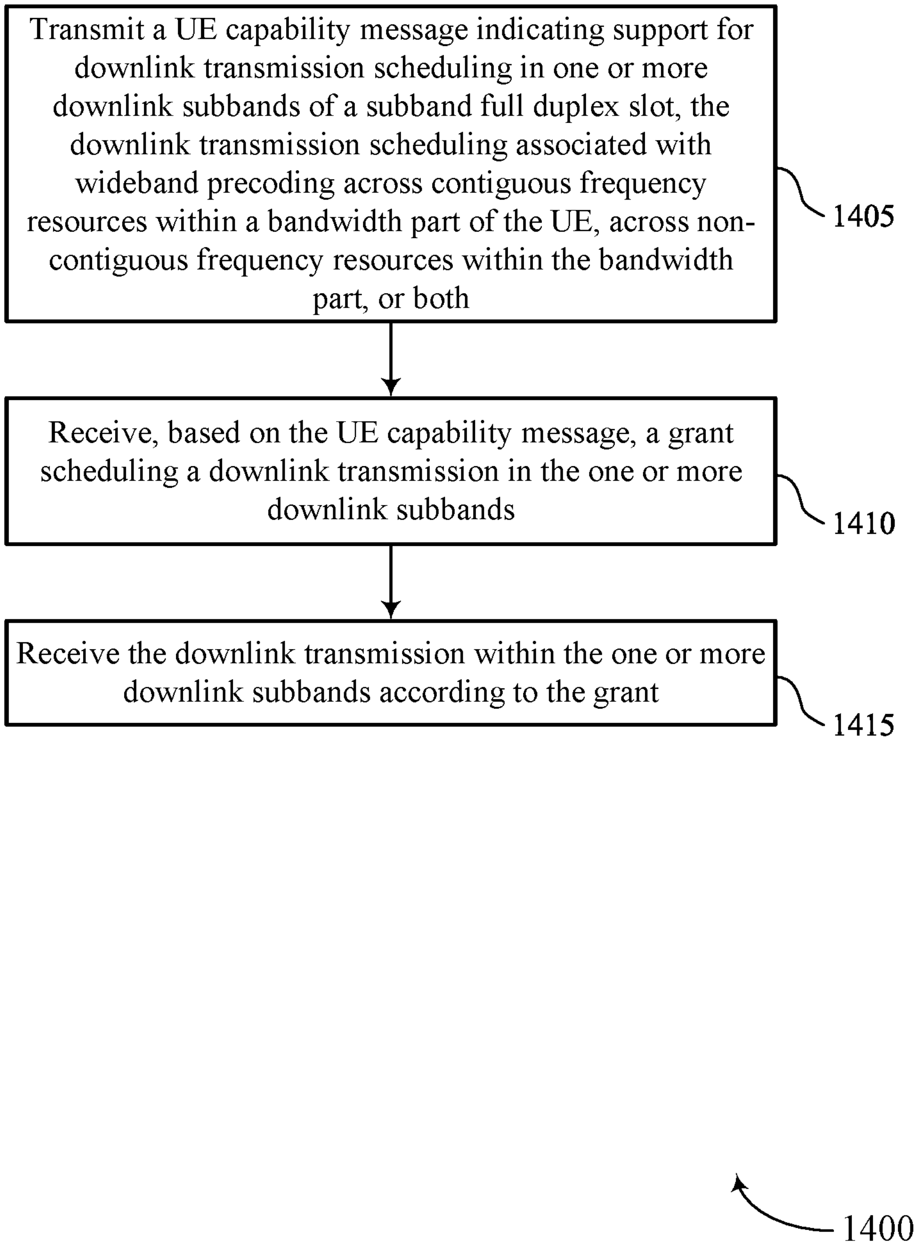

FIG. 14 shows a flowchart illustrating a method 1400 that supports wideband downlink precoding in SBFD symbols in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The operations of block 1405 may be performed in accordance with examples as disclosed herein. In some examples, aspects of the operations of 1405 may be performed by a capability manager 740 as described with reference to FIG. 7.

At 1410, the method may include receiving, based on the UE capability message, a grant scheduling a downlink transmission in the one or more downlink subbands. The operations of block 1410 may be performed in accordance with examples as disclosed herein. In some examples, aspects of the operations of 1410 may be performed by a grant manager 730 as described with reference to FIG. 7.

At 1415, the method may include receiving the downlink transmission within the one or more downlink subbands according to the grant. The operations of block 1415 may be performed in accordance with examples as disclosed herein. In some examples, aspects of the operations of 1415 may be performed by a transmission manager 735 as described with reference to FIG. 7.

Figure 15:
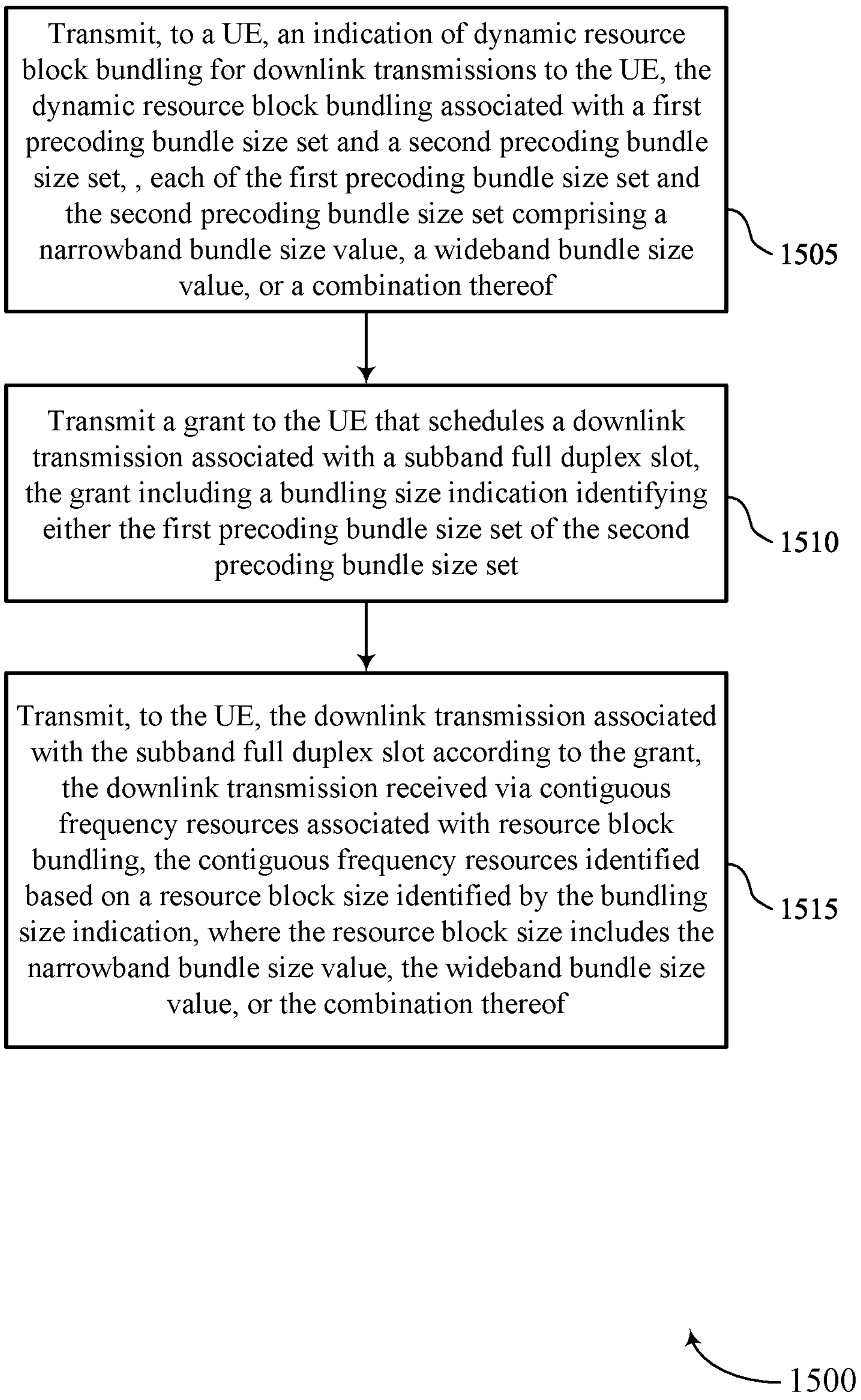

FIG. 15 shows a flowchart illustrating a method 1500 that supports wideband downlink precoding in SBFD symbols in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, an indication of dynamic resource block bundling for downlink transmissions to the UE, the dynamic resource block bundling associated with a first precoding bundle size set and a second precoding bundle size set, each of the first precoding bundle size set and the second precoding bundle size set comprising a narrowband bundle size value, a wideband bundle size value, or a combination thereof. The operations of block 1505 may be performed in accordance with examples as disclosed herein. In some examples, aspects of the operations of 1505 may be performed by a configuration manager 1125 as described with reference to FIG. 11.

At 1510, the method may include transmitting a grant to the UE that schedules a downlink transmission associated with a SBFD slot, the grant including a bundling size indication identifying either the first precoding bundle size set of the second precoding bundle size set. The operations of block 1510 may be performed in accordance with examples as disclosed herein. In some examples, aspects of the operations of 1510 may be performed by a grant manager 1130 as described with reference to FIG. 11.

At 1515, the method may include transmitting, to the UE, the downlink transmission associated with the SBFD slot according to the grant, the downlink transmission received via contiguous frequency resources associated with resource block bundling, the contiguous frequency resources identified based on a resource block size identified by the bundling size indication, where the resource block size includes the narrowband bundle size value, the wideband bundle size value, or the combination thereof. The operations of block 1515 may be performed in accordance with examples as disclosed herein. In some examples, aspects of the operations of 1515 may be performed by a transmission manager 1135 as described with reference to FIG. 11.

Figure 16:
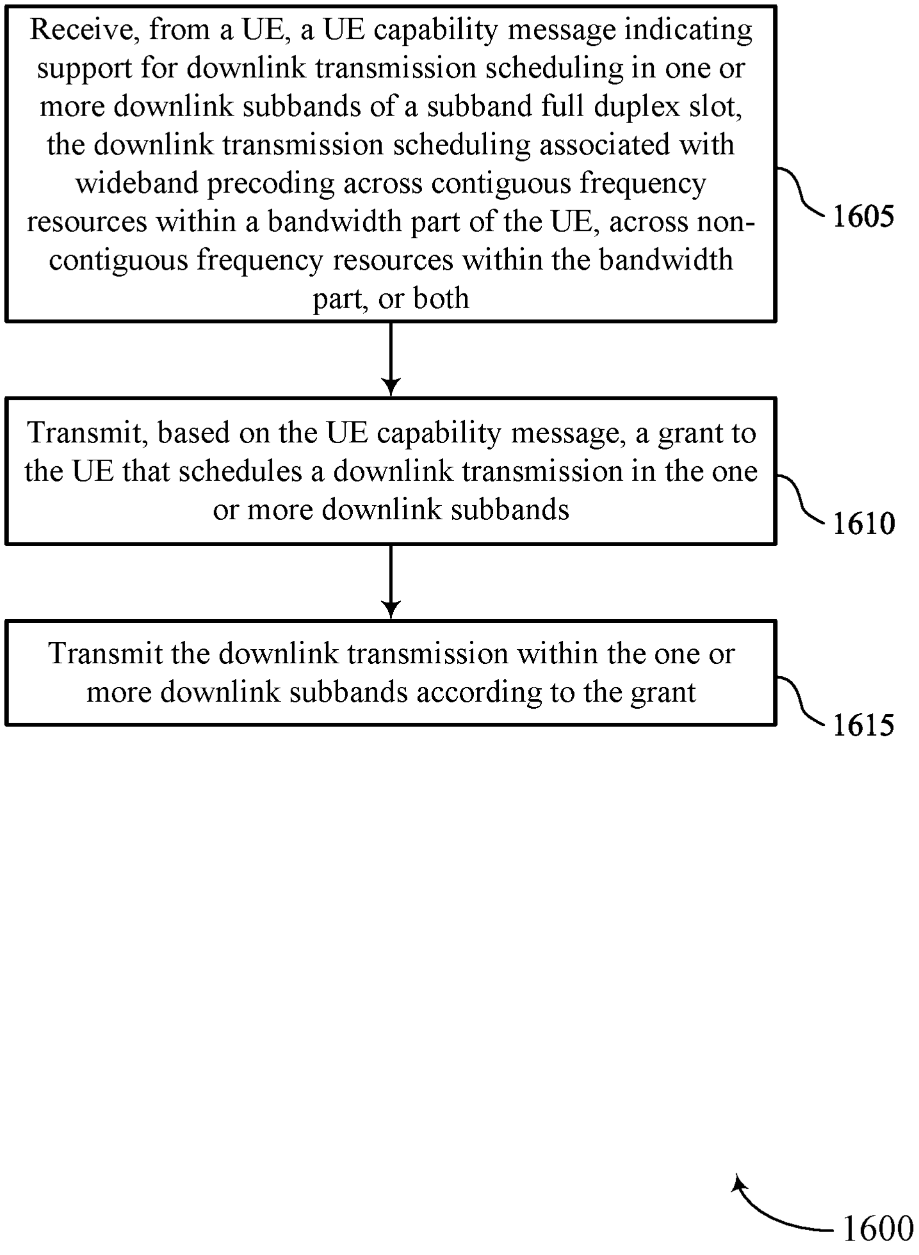

FIG. 16 shows a flowchart illustrating a method 1600 that supports wideband downlink precoding in SBFD symbols in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a UE capability message indicating support for downlink transmission scheduling in one or more downlink subbands of a SBFD slot, the downlink transmission scheduling associated with wideband precoding across contiguous frequency resources within a bandwidth part of the UE, across non-contiguous frequency resources within the bandwidth part, or both. The operations of block 1605 may be performed in accordance with examples as disclosed herein. In some examples, aspects of the operations of 1605 may be performed by a capability manager 1140 as described with reference to FIG. 11.

At 1610, the method may include transmitting, based on the UE capability message, a grant to the UE that schedules a downlink transmission in the one or more downlink subbands. The operations of block 1610 may be performed in accordance with examples as disclosed herein. In some examples, aspects of the operations of 1610 may be performed by a grant manager 1130 as described with reference to FIG. 11.

At 1615, the method may include transmitting the downlink transmission within the one or more downlink subbands according to the grant. The operations of block 1615 may be performed in accordance with examples as disclosed herein. In some examples, aspects of the operations of 1615 may be performed by a transmission manager 1135 as described with reference to FIG. 11.

The following provides an overview of aspects of the present disclosure:

Aspect 1: A method for wireless communications at a UE, comprising: receiving an indication of dynamic RB bundling for downlink transmissions, the dynamic RB bundling associated with a first precoding bundle size set and a second precoding bundle size set, each of the first precoding bundle size set and the second precoding bundle size set comprising a narrowband bundle size value, a wideband bundle size value, or a combination thereof; receiving a grant scheduling a downlink transmission associated with a SBFD slot, the grant comprising a bundling size indication identifying either the first precoding bundle size set or the second precoding bundle size set; and receiving the downlink transmission associated with the SBFD slot according to the grant, the downlink transmission received via contiguous frequency resources associated with RB bundling, the contiguous frequency resources identified based at least in part on a RB size identified by the bundling size indication, wherein the RB size comprises the narrowband bundle size value, the wideband bundle size value, or the combination thereof.

Aspect 2: The method of aspect 1, further comprising: selecting the first precoding bundle size set based at least in part on the bundling size indication, the first precoding bundle size set comprising both the narrowband bundle size value and the wideband bundle size value; and determining the RB bundling as either wideband or narrowband based at least in part on the first precoding bundle size set and a subband size, a BWP size, or both, associated with the downlink transmission.

Aspect 3: The method of aspect 2, further comprising: determining that the RB bundling comprises wideband based at least in part on a number of scheduled RBs for the downlink transmission comprising contiguous frequency resources and the number of scheduled RBs is larger than half of the subband size.

Aspect 4: The method of any of aspects 2 through 3, further comprising: determining that the RB bundling comprises narrowband based at least in part on a number of scheduled RBs for the downlink transmission being less than half of the subband size.

Aspect 5: The method of any of aspects 2 through 4, further comprising: determining that the RB bundling comprises wideband based at least in part on a number of scheduled RBs for the downlink transmission comprising contiguous frequency resources and the number of scheduled RBs is greater than half of a number of subband frequency resources overlapping with a BWP size.

Aspect 6: The method of any of aspects 2 through 5, further comprising: determining that the RB bundling comprises narrowband based at least in part on a number of scheduled RBs for the downlink transmission being less than half of a number of subband frequency resources overlapping with a BWP size.

Aspect 7: The method of any of aspects 2 through 6, further comprising: determining that the RB bundling comprises wideband based at least in part on a number of scheduled RBs for the downlink transmission comprising contiguous frequency resources and the number of scheduled RBs is greater than one quarter of the BWP size.

Aspect 8: The method of any of aspects 2 through 7, further comprising: determining that the RB bundling comprises narrowband based at least in part on a number of scheduled RBs for the downlink transmission being less than one quarter of the BWP size.

Aspect 9: The method of any of aspects 1 through 8, further comprising: receiving a signal identifying a first number of RBs for wideband precoding; and identifying the RB bundling based at least in part on a second number of scheduled RBs for the downlink transmission, the first number of RBs for wideband precoding and the bundling size indication.

Aspect 10: The method of aspect 9, further comprising: determining that the RB bundling comprises wideband based at least in part on the second number of scheduled RBs for the downlink transmission comprising contiguous frequency resources and the second number of scheduled RBs being greater than the first number of RBs for wideband precoding.

Aspect 11: The method of any of aspects 9 through 10, further comprising: determining that the RB bundling comprises narrowband based at least in part on the second number of scheduled RBs for the downlink transmission being less than the first number of RBs for wideband precoding.

Aspect 12: The method of any of aspects 1 through 11, wherein receiving the downlink transmission comprises: assuming a same TCI state, a same QCL relationship, or both, for the contiguous frequency resources, for a BWP size associated with the downlink transmission, or both.

Aspect 13: The method of any of aspects 1 through 12, wherein the first precoding bundle size set comprises both the wideband bundle size value and the narrowband bundle size value and the second precoding bundle size set comprises one of the wideband bundle size value or the narrowband bundle size value.

Aspect 14: The method of any of aspects 1 through 13, wherein the first precoding bundle size set comprises a singular first bundle size value and the second precoding bundle size set comprise a singular second bundle size value, at least one of the singular first bundle size value or the singular second bundle size value comprise the wideband bundle size value.

Aspect 15: The method of any of aspects 1 through 14, wherein the first precoding bundle size set comprises a singular first bundle size value and the second precoding bundle size set comprise a singular second bundle size value that is different from the singular first bundle size value, the singular first bundle size value and the singular second bundle size value comprise numerical values.

Aspect 16: The method of any of aspects 1 through 15, wherein the indication of the dynamic RB bundling is received via radio resource control signaling, the indication further identifying the first precoding bundle size set and the second precoding bundle size set.

Aspect 17: A method for wireless communications at a UE, comprising: transmitting a UE capability message indicating support for downlink transmission scheduling in one or more downlink subbands of a SBFD slot, the downlink transmission scheduling associated with wideband precoding across contiguous frequency resources within a BWP of the UE, across non-contiguous frequency resources within the BWP, or both; receiving, based at least in part on the UE capability message, a grant scheduling a downlink transmission in the one or more downlink subbands; and receiving the downlink transmission within the one or more downlink subbands according to the grant.

Aspect 18: The method of aspect 17, further comprising: indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

Aspect 19: The method of aspect 18, further comprising: assuming a same TCI state, a same QCL relationship, or both, per set of contiguous frequency resources.

Aspect 20: The method of any of aspects 17 through 19, further comprising: indicating, via the UE capability message, a support for a common wideband precoding across two sets of contiguous frequency resources in at least two subbands within the BWP.

Aspect 21: The method of aspect 20, further comprising: assuming a same TCI state, a same QCL relationship, or both, across the two sets of contiguous frequency resources.

Aspect 22: The method of any of aspects 17 through 21, further comprising: indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is a same precoding as the second wideband precoding.

Aspect 23: The method of aspect 22, further comprising: assuming a same TCI state, a same QCL relationship, or both, per set of contiguous frequency resources.

Aspect 24: The method of any of aspects 17 through 23, further comprising: indicating, via the UE capability message, a maximum number of sets of contiguous frequency resources for the wideband precoding supported by the UE, wherein a default maximum number of sets is two sets.

Aspect 25: A method for wireless communications at a network entity, comprising: transmitting, to a UE, an indication of dynamic RB bundling for downlink transmissions to the UE, the dynamic RB bundling associated with a first precoding bundle size set and a second precoding bundle size set, each of the first precoding bundle size set and the second precoding bundle size set comprising a narrowband bundle size value, a wideband bundle size value, or a combination thereof; transmitting a grant to the UE that schedules a downlink transmission associated with a SBFD slot, the grant comprising a bundling size indication identifying either the first precoding bundle size set of the second precoding bundle size set; and transmitting, to the UE, the downlink transmission associated with the SBFD slot according to the grant, the downlink transmission received via contiguous frequency resources associated with RB bundling, the contiguous frequency resources identified based at least in part on a RB size identified by the bundling size indication, wherein the RB size comprises the narrowband bundle size value, the wideband bundle size value, or the combination thereof.

Aspect 26: The method of aspect 25, further comprising: identifying, via the bundling size indication, the first precoding bundle size set, the first precoding bundle size set comprising both the narrowband bundle size value and the wideband bundle size value; and determining the RB bundling as either wideband or narrowband based at least in part on the first precoding bundle size set and a subband size, a BWP size, or both, associated with the downlink transmission.

Aspect 27: The method of aspect 26, further comprising: determining that the RB bundling comprises wideband based at least in part on a number of scheduled RBs for the downlink transmission comprising contiguous frequency resources and the number of scheduled RBs is larger than half of the subband size.

Aspect 28: The method of any of aspects 26 through 27, further comprising: determining that the RB bundling comprises narrowband based at least in part on a number of scheduled RBs for the downlink transmission being less than half of the subband size.

Aspect 29: The method of any of aspects 26 through 28, further comprising: determining that the RB bundling comprises wideband based at least in part on a number of scheduled RBs for the downlink transmission comprising contiguous frequency resources and the number of scheduled RBs is greater than half of a number of subband frequency resources overlapping with a BWP size.

Aspect 30: The method of any of aspects 26 through 29, further comprising: determining that the RB bundling comprises narrowband based at least in part on a number of scheduled RBs for the downlink transmission being less than half of a number of subband frequency resources overlapping with a BWP size.

Aspect 31: The method of any of aspects 26 through 30, further comprising: determining that the RB bundling comprises wideband based at least in part on a number of scheduled RBs for the downlink transmission comprising contiguous frequency resources and the number of scheduled RBs is greater than one quarter of the BWP size.

Aspect 32: The method of any of aspects 26 through 31, further comprising: determining that the RB bundling comprises narrowband based at least in part on a number of scheduled RBs for the downlink transmission being less than one quarter of the BWP size.

Aspect 33: The method of any of aspects 25 through 32, further comprising: transmitting a signal identifying a first number of RBs for wideband precoding, wherein the RB bundling is identified based at least in part on second a number of scheduled RBs for the downlink transmission, the first number of RBs for wideband precoding and the bundling size indication.

Aspect 34: The method of aspect 33, further comprising: determining that the RB bundling comprises wideband based at least in part on the second number of scheduled RBs for the downlink transmission comprising contiguous frequency resources and the second number of scheduled RBs being greater than the first number of RBs for wideband precoding.

Aspect 35: The method of any of aspects 33 through 34, further comprising: determining that the RB bundling comprises narrowband based at least in part on the second number of scheduled RBs for the downlink transmission being less than the first number of RBs for wideband precoding.

Aspect 36: The method of any of aspects 25 through 35, wherein transmitting the downlink transmission comprises: assuming a same TCI state, a same QCL relationship, or both, for the contiguous frequency resources, for a BWP size associated with the downlink transmission, or both.

Aspect 37: The method of any of aspects 25 through 36, wherein the first precoding bundle size set comprises both the wideband bundle size value and the narrowband bundle size value and the second precoding bundle size set comprises one of the wideband bundle size value or the narrowband bundle size value.

Aspect 38: The method of any of aspects 25 through 37, wherein the first precoding bundle size set comprises a singular first bundle size value and the second precoding bundle size set comprise a singular second bundle size value, at least one of the singular first bundle size value or the singular second bundle size value comprise the wideband bundle size value.

Aspect 39: The method of any of aspects 25 through 38, wherein the first precoding bundle size set comprises a singular first bundle size value and the second precoding bundle size set comprise a singular second bundle size value that is different from the singular first bundle size value, the singular first bundle size value and the singular second bundle size value comprise numerical values.

Aspect 40: The method of any of aspects 25 through 39, wherein the indication of the dynamic RB bundling is received via radio resource control signaling, the indication further identifying the first precoding bundle size set and the second precoding bundle size set.

Aspect 41: A method for wireless communications at a network entity, comprising: receiving, from a UE, a UE capability message indicating support for downlink transmission scheduling in one or more downlink subbands of a SBFD slot, the downlink transmission scheduling associated with wideband precoding across contiguous frequency resources within a BWP of the UE, across non-contiguous frequency resources within the BWP, or both; transmitting, based at least in part on the UE capability message, a grant to the UE that schedules a downlink transmission in the one or more downlink subbands; and transmitting the downlink transmission within the one or more downlink subbands according to the grant.

Aspect 42: The method of aspect 41, further comprising: identifying, based at least in part on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

Aspect 43: The method of aspect 42, further comprising: assuming a same TCI state, a same QCL relationship, or both, per set of contiguous frequency resources.

Aspect 44: The method of any of aspects 41 through 43, further comprising: identifying, based at least in part on the UE capability message, a support for a common wideband precoding across two sets of contiguous frequency resources in at least two subbands within the BWP.

Aspect 45: The method of aspect 44, further comprising: assuming a same TCI state, a same QCL relationship, or both, across the two sets of contiguous frequency resources.

Aspect 46: The method of any of aspects 41 through 45, further comprising: identifying, based at least in part on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is a same precoding as the second wideband precoding.

Aspect 47: The method of aspect 46, further comprising: assuming a same TCI state, a same QCL relationship, or both, per set of contiguous frequency resources.

Aspect 48: The method of any of aspects 41 through 47, further comprising: indicating, via the UE capability message, a maximum number of sets of contiguous frequency resources for the wideband precoding supported by the UE, wherein a default maximum number of sets is two sets.

Aspect 49: An apparatus for wireless communications at a UE, comprising one or more memories storing processor-executable code; and one or more processors coupled with the one or more memories and individually or collectively operable to execute the code to cause the UE to perform a method of any of aspects 1 through 16.

Aspect 50: An apparatus for wireless communications at a UE, comprising at least one means for performing a method of any of aspects 1 through 16.

Aspect 51: A non-transitory computer-readable medium storing code for wireless communications at a UE, the code comprising instructions executable by one or more processors to perform a method of any of aspects 1 through 16.

Aspect 52: An apparatus for wireless communications at a UE, comprising one or more memories storing processor-executable code; and one or more processors coupled with the one or more memories and individually or collectively operable to execute the code to cause the UE to perform a method of any of aspects 17 through 24.

Aspect 53: An apparatus for wireless communications at a UE, comprising at least one means for performing a method of any of aspects 17 through 24.

Aspect 54: A non-transitory computer-readable medium storing code for wireless communications at a UE, the code comprising instructions executable by one or more processors to perform a method of any of aspects 17 through 24.

Aspect 55: An apparatus for wireless communications at a network entity, comprising one or more memories storing processor-executable code; and one or more processors coupled with the one or more memories and individually or collectively operable to execute the code to cause the UE to perform a method of any of aspects 25 through 40.

Aspect 56: An apparatus for wireless communications at a network entity, comprising at least one means for performing a method of any of aspects 25 through 40.

Aspect 57: A non-transitory computer-readable medium storing code for wireless communications at a network entity, the code comprising instructions executable by one or more processors to perform a method of any of aspects 25 through 40.

Aspect 58: An apparatus for wireless communications at a network entity, comprising one or more memories storing processor-executable code; and one or more processors coupled with the one or more memories and individually or collectively operable to execute the code to cause the UE to perform a method of any of aspects 41 through 48.

Aspect 59: An apparatus for wireless communications at a network entity, comprising at least one means for performing a method of any of aspects 41 through 48.

Aspect 60: A non-transitory computer-readable medium storing code for wireless communications at a network entity, the code comprising instructions executable by one or more processors to perform a method of any of aspects 41 through 48.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:

one or more memories storing processor-executable code; and one or more processors coupled with the one or more memories and individually or collectively operable to execute the code to cause the UE to:

transmit a UE capability message indicating support for downlink transmission scheduling in one or more downlink subbands of a subband full duplex slot, wherein the UE capability message indicates the support for the downlink transmission scheduling associated with wideband precoding across contiguous frequency resources within a bandwidth part of the UE, across non-contiguous frequency resources within the bandwidth part, or both;

receive, based at least in part on the UE capability message, a grant scheduling a downlink transmission in the one or more downlink subbands; and receive the downlink transmission within the one or more downlink subbands according to the grant.

2. The UE of claim 1, wherein the one or more processors are individually or collectively further operable to execute the code to cause the UE to:

indicate, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

3. The UE of claim 2, wherein the one or more processors are individually or collectively further operable to execute the code to cause the UE to:

assume a same transmission configuration index (TCI) state, a same quasi-collocation (QCL) relationship, or both, per set of contiguous frequency resources.

4. The UE of claim 1, wherein the one or more processors are individually or collectively further operable to execute the code to cause the UE to:

indicate, via the UE capability message, a support for a common wideband precoding across two sets of contiguous frequency resources in at least two subbands within the bandwidth part.

5. The UE of claim 4, wherein the one or more processors are individually or collectively further operable to execute the code to cause the UE to:

assume a same transmission configuration index (TCI) state, a same quasi-collocation (QCL) relationship, or both, across the two sets of contiguous frequency resources.

6. The UE of claim 1, wherein the one or more processors are individually or collectively further operable to execute the code to cause the UE to:

indicate, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is a same precoding as the second wideband precoding.

7. The UE of claim 6, wherein the one or more processors are individually or collectively further operable to execute the code to cause the UE to:

assume a same transmission configuration index (TCI) state, a same quasi-collocation (QCL) relationship, or both, per set of contiguous frequency resources.

8. The UE of claim 1, wherein the one or more processors are individually or collectively further operable to execute the code to cause the UE to:

indicate, via the UE capability message, a maximum number of sets of contiguous frequency resources for the wideband precoding supported by the UE.

9. The UE of claim 8, wherein a default maximum number of sets is two sets.

10. A network entity for wireless communications, comprising:

one or more memories storing processor-executable code; and one or more processors coupled with the one or more memories and individually or collectively operable to execute the code to cause the network entity to:

receive, from a user equipment (UE), a UE capability message indicating support for downlink transmission scheduling in one or more downlink subbands of a subband full duplex slot, wherein the UE capability message indicates the support for the downlink transmission scheduling associated with wideband precoding across contiguous frequency resources within a bandwidth part of the UE, across non-contiguous frequency resources within the bandwidth part, or both;

transmit, based at least in part on the UE capability message, a grant to the UE that schedules a downlink transmission in the one or more downlink subbands; and transmit the downlink transmission within the one or more downlink subbands according to the grant.

11. The network entity of claim 10, wherein the one or more processors are individually or collectively further operable to execute the code to cause the network entity to:

identifying, based at least in part on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

12. The network entity of claim 11, wherein the one or more processors are individually or collectively further operable to execute the code to cause the network entity to:

assume a same transmission configuration index (TCI) state, a same quasi-collocation (QCL) relationship, or both, per set of contiguous frequency resources.

13. The network entity of claim 10, wherein the one or more processors are individually or collectively further operable to execute the code to cause the network entity to:

identifying, based at least in part on the UE capability message, a support for a common wideband precoding across two sets of contiguous frequency resources in at least two subbands within the bandwidth part.

14. The network entity of claim 13, wherein the one or more processors are individually or collectively further operable to execute the code to cause the network entity to:

assume a same transmission configuration index (TCI) state, a same quasi-collocation (QCL) relationship, or both, across the two sets of contiguous frequency resources.

15. The network entity of claim 10, wherein the one or more processors are individually or collectively further operable to execute the code to cause the network entity to:

identifying, based at least in part on the UE capability message, a first support for a first wideband precoding for first set of contiguous frequency resources in a first subband of the one or more downlink subbands and a second support for a second wideband precoding for a second set of contiguous frequency resources in a second subband of the one or more downlink subbands, wherein the first wideband precoding is a same precoding as the second wideband precoding.

16. The network entity of claim 15, wherein the one or more processors are individually or collectively further operable to execute the code to cause the network entity to:

assume a same transmission configuration index (TCI) state, a same quasi-collocation (QCL) relationship, or both, per set of contiguous frequency resources.

17. The network entity of claim 10, wherein the one or more processors are individually or collectively further operable to execute the code to cause the network entity to:

indicate, via the UE capability message, a maximum number of sets of contiguous frequency resources for the wideband precoding supported by the UE.

18. The network entity of claim 17, wherein a default maximum number of sets is two sets.

19. A method for wireless communications at a user equipment (UE), comprising:
transmitting a UE capability message indicating support for downlink transmission scheduling in one or more downlink subbands of a subband full duplex slot, wherein the UE capability message indicates the support for the downlink transmission scheduling associated with wideband precoding across contiguous frequency resources within a bandwidth part of the UE, across non-contiguous frequency resources within the bandwidth part, or both;
receiving, based at least in part on the UE capability message, a grant scheduling a downlink transmission in the one or more downlink subbands; and
receiving the downlink transmission within the one or more downlink subbands according to the grant.

20. The method of claim 19, further comprising:
indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

21. The method of claim 20, further comprising:
assuming a same transmission configuration index (TCI) state, a same quasi-collocation (QCL) relationship, or both, per set of contiguous frequency resources.

22. The method of claim 19, further comprising:
indicating, via the UE capability message, a support for a common wideband precoding across two sets of contiguous frequency resources in at least two subbands within the bandwidth part.

23. The method of claim 22, further comprising:
assuming a same transmission configuration index (TCI) state, a same quasi-collocation (QCL) relationship, or both, across the two sets of contiguous frequency resources.

24. The method of claim 19, further comprising:
indicating, via the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is a same precoding as the second wideband precoding.

25. The method of claim 24, further comprising:
assuming a same transmission configuration index (TCI) state, a same quasi-collocation (QCL) relationship, or both, per set of contiguous frequency resources.

26. The method of claim 19, further comprising:
indicating, via the UE capability message, a maximum number of sets of contiguous frequency resources for the wideband precoding supported by the UE.

27. The method of claim 26, wherein a default maximum number of sets is two sets.

28. A method for wireless communications at a network entity, comprising:
receiving, from a user equipment (UE), a UE capability message indicating support for downlink transmission scheduling in one or more downlink subbands of a subband full duplex slot, wherein the UE capability message indicates the support for the downlink transmission scheduling associated with wideband precoding across contiguous frequency resources within a bandwidth part of the UE, across non-contiguous frequency resources within the bandwidth part, or both;
transmitting, based at least in part on the UE capability message, a grant to the UE that schedules a downlink transmission in the one or more downlink subbands; and
transmitting the downlink transmission within the one or more downlink subbands according to the grant.

29. The method of claim 28, further comprising:
identifying, based at least in part on the UE capability message, a first support for a first wideband precoding for a first set of contiguous frequency resources in a first subband of the one or more downlink subbands and a second support for a second wideband precoding for a second set of contiguous frequency resources in a second subband of the one or more downlink subbands, wherein the first wideband precoding is different from the second wideband precoding.

30. The method of claim 29, further comprising:
assuming a same transmission configuration index (TCI) state, a same quasi-collocation (QCL) relationship, or both, per set of contiguous frequency resources.

* * * * *